United States Patent
Norieda et al.

(10) Patent No.: US 12,468,499 B2
(45) Date of Patent: Nov. 11, 2025

(54) ANALYSIS APPARATUS, ANALYSIS SYSTEM, ANALYSIS METHOD, AND NON-TRANSITORY COMPUTER READABLE MEDIUM STORING PROGRAM

(71) Applicant: NEC Corporation, Tokyo (JP)

(72) Inventors: Shin Norieda, Tokyo (JP); Yoshiyuki Tanaka, Tokyo (JP); Shogo Akasaki, Tokyo (JP); Haruki Yokota, Tokyo (JP); Masami Sakaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 244 days.

(21) Appl. No.: 18/029,589

(22) PCT Filed: Oct. 12, 2020

(86) PCT No.: PCT/JP2020/038531
§ 371 (c)(1),
(2) Date: Mar. 30, 2023

(87) PCT Pub. No.: WO2022/079777
PCT Pub. Date: Apr. 21, 2022

(65) Prior Publication Data
US 2023/0367535 A1    Nov. 16, 2023

(51) Int. Cl.
*G06F 3/14*    (2006.01)
*G06F 3/01*    (2006.01)
(Continued)

(52) U.S. Cl.
CPC ............ *G06F 3/1454* (2013.01); *G06F 3/011* (2013.01); *G06T 7/11* (2017.01); *G06T 11/00* (2013.01); *G06T 2207/30201* (2013.01)

(58) Field of Classification Search
CPC .. G06F 3/1454; G06F 3/011; G06F 2203/011; G06F 3/14; G06F 3/01;
(Continued)

(56) References Cited

U.S. PATENT DOCUMENTS

| | | |
|---|---|---|
| 2005/0209848 A1 | 9/2005 | Ishii |
| 2012/0222057 A1 | 8/2012 | Sadowsky et al. |

(Continued)

FOREIGN PATENT DOCUMENTS

| | | |
|---|---|---|
| JP | 2005-277462 A | 10/2005 |
| JP | 2014-511620 A | 5/2014 |

(Continued)

OTHER PUBLICATIONS

International Search Report for PCT Application No. PCT/JP2020/038531, mailed on Dec. 8, 2020.

*Primary Examiner* — Yosef K Laekemariam
(74) *Attorney, Agent, or Firm* — Sughrue Mion, PLLC

(57) ABSTRACT

An analysis apparatus acquires individual emotion data for each participant generated on the basis of face image data of the participants in an online meeting during the meeting. The analysis apparatus generates, for each participant, analysis data indicating a degree of emotion in the online meeting on the basis of the individual emotion data. The analysis apparatus stores each piece of the analysis data for each participant in association with corresponding color tone information. The analysis apparatus generates, as a display image indicating a state of the online meeting, an image in which element figures represented by the color tone information associated with the analysis data are disposed for each of a plurality of the participants who have participated in the online meeting. The analysis apparatus outputs the generated display image.

18 Claims, 15 Drawing Sheets

(51) Int. Cl.
*G06T 7/11* (2017.01)
*G06T 11/00* (2006.01)

(58) Field of Classification Search
CPC . G06T 7/11; G06T 11/00; G06T 2207/30201; G06V 10/26; G06V 40/174; H04N 21/21; H04N 21/24; H04N 21/258; H04N 21/83
See application file for complete search history.

(56) References Cited

U.S. PATENT DOCUMENTS

| | | | |
|---|---|---|---|
| 2017/0098122 A1 | 4/2017 | El Kaliouby et al. | |
| 2020/0099890 A1* | 3/2020 | Tanaka | H04N 7/147 |
| 2021/0076002 A1* | 3/2021 | Peters | H04N 7/152 |

FOREIGN PATENT DOCUMENTS

| | | |
|---|---|---|
| JP | 2018-084874 A | 5/2018 |
| JP | 2019-061594 A | 4/2019 |
| JP | 2020-048149 A | 3/2020 |

* cited by examiner

ANALYSIS APPARATUS, ANALYSIS SYSTEM, ANALYSIS METHOD, AND NON-TRANSITORY COMPUTER READABLE MEDIUM STORING PROGRAM

This application is a National Stage Entry of PCT/JP2020/038531 filed on Oct. 12, 2020, the contents of all of which are incorporated herein by reference, in their entirety.

TECHNICAL FIELD

The present disclosure relates to an analysis apparatus, an analysis system, an analysis method, and a non-transitory computer readable medium storing a program.

BACKGROUND ART

Techniques for ascertaining the emotions of participants in an online meeting have been proposed.

Patent Literature 1 describes a meeting support system for the purpose of generating meeting minutes in which the atmosphere of attendees and the reaction of each person during a meeting can be ascertained in more detail than before. The meeting support system described in Patent Literature 1 includes image input means for inputting images of faces of a plurality of attendees of a meeting, emotion discrimination means for discriminating emotions of the respective attendees on the basis of the input images, and voice input means for inputting vocal sound of the attendees. The meeting support system further includes text data generation means for generating text data indicating contents of speech of the attendees on the basis of input vocal sound, and meeting minutes generation means. The meeting minutes generation means generates meeting minutes in which contents of speech and emotions of the respective attendees at the time of the speech are recorded on the basis of the discrimination result from the emotion discrimination means and the text data generated by the text data generation means.

Patent Literature 2 describes a meeting system for the purpose of more accurately reflecting the state of meeting participants in the progress of a meeting. The meeting system described in Patent Literature 2 includes biological information acquisition means for acquiring biological information of a participant in a meeting during the meeting, the biological information changing reflecting a state of the participant, determination means for determining a psychological state of the participant on the basis of the biological information of the participant, and decision means. The decision means decides a proposal content to the meeting on the basis of a determination result regarding a psychological state of the participant.

CITATION LIST

Patent Literature

Patent Literature 1: Japanese Unexamined Patent Application Publication No. 2005-277462
Patent Literature 2: Japanese Unexamined Patent Application Publication No. 2018-084874

SUMMARY OF INVENTION

Technical Problem

In an online meeting, participants are present at separate places and communicate via terminals. Therefore, it is difficult to grasp the atmosphere of the meeting and the reaction of the participants in the online meeting, and a system capable of allowing such grasping at a glance is desired.

The present disclosure has been made in view of the above problems, and an object of the present disclosure is to provide an analysis apparatus and the like for effectively managing an online meeting.

Solution to Problem

An analysis apparatus according to a first aspect of the present disclosure includes emotion data acquisition means, analysis data generation means, storage means, image generation means, and output means. The emotion data acquisition means acquires individual emotion data for each participant generated on the basis of face image data of the participants in an online meeting during the meeting. The analysis data generation means generates, for each participant, analysis data indicating a degree of emotion in the online meeting on the basis of the individual emotion data. The storage means stores each piece of the analysis data for each participant in association with corresponding color tone information. The image generation means generates, as a display image indicating a state of the online meeting, an image in which element figures represented by the color tone information associated with the analysis data are disposed for each of a plurality of the participants who have participated in the online meeting. The output means outputs the display image.

In an analysis method according to a second aspect of the present disclosure, a computer acquires individual emotion data for each participant generated on the basis of face image data of the participants in an online meeting during the meeting. In the analysis method, the computer generates, for each participant, analysis data indicating a degree of emotion in the online meeting based on the individual emotion data, and stores each piece of the analysis data for each participant in association with corresponding color tone information. In the analysis method, the computer generates, as a display image indicating a state of the online meeting, an image in which element figures represented by the color tone information associated with the analysis data are disposed for each of a plurality of the participants who have participated in the online meeting. In the analysis method, the computer outputs the display image.

A non-transitory computer readable medium according to a third aspect of the present disclosure is a non-transitory computer readable medium storing an analysis program for causing a computer to execute the following first to fifth processes. The first process is a process of acquiring individual emotion data for each participant generated on the basis of face image data of the participants in an online meeting during the meeting. The second process is a process of generating, for each participant, analysis data indicating a degree of emotion in the online meeting on the basis of the individual emotion data. The third process is a process of storing each piece of the analysis data for each participant in association with corresponding color tone information. The fourth process is a process of generating, as a display image indicating a state of the online meeting, an image in which element figures represented by the color tone information associated with the analysis data are disposed for each of a plurality of the participants who have participated in the online meeting. The fifth process is a process of outputting the display image.

Advantageous Effects of Invention

According to the present disclosure, it is possible to provide an analysis apparatus and the like for effectively managing an online meeting.

EXAMPLE EMBODIMENT

Figure 1:
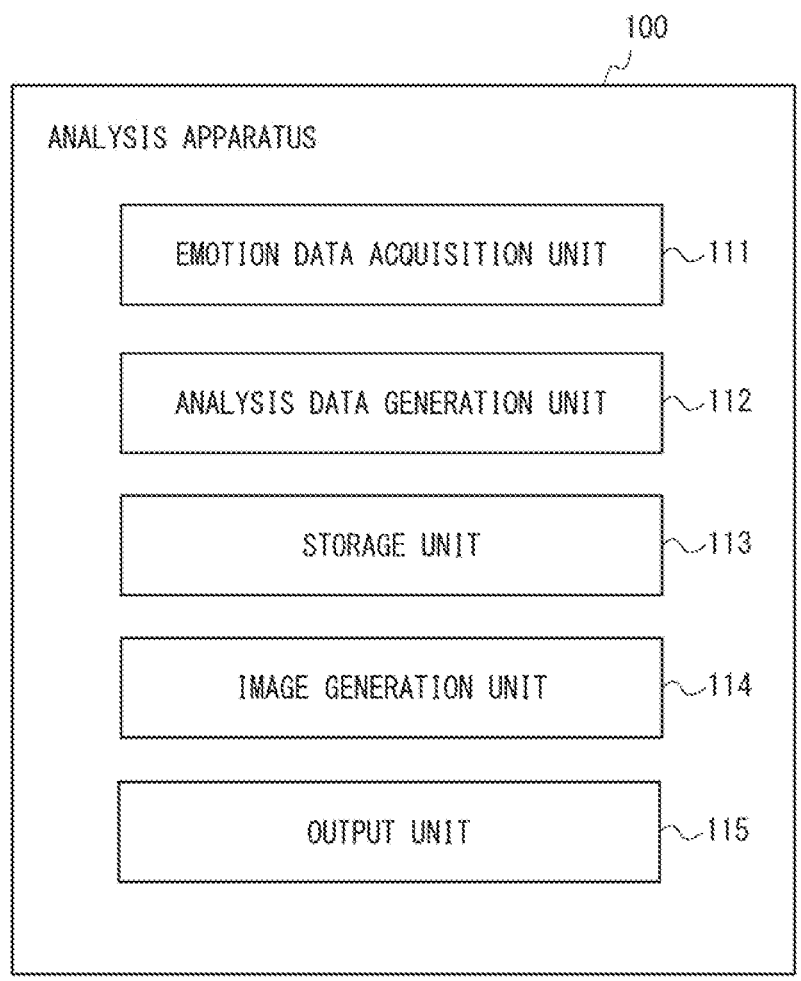
FIG. 1 is a block diagram showing a configuration example of an analysis apparatus according to a first example embodiment.

Hereinafter, example embodiments of the present disclosure will be described in detail with reference to the drawings. In the drawings, the same or corresponding elements are denoted by the same reference numerals, and redundant description will be omitted as necessary for clarity of description.

First Example Embodiment

Figure 2:
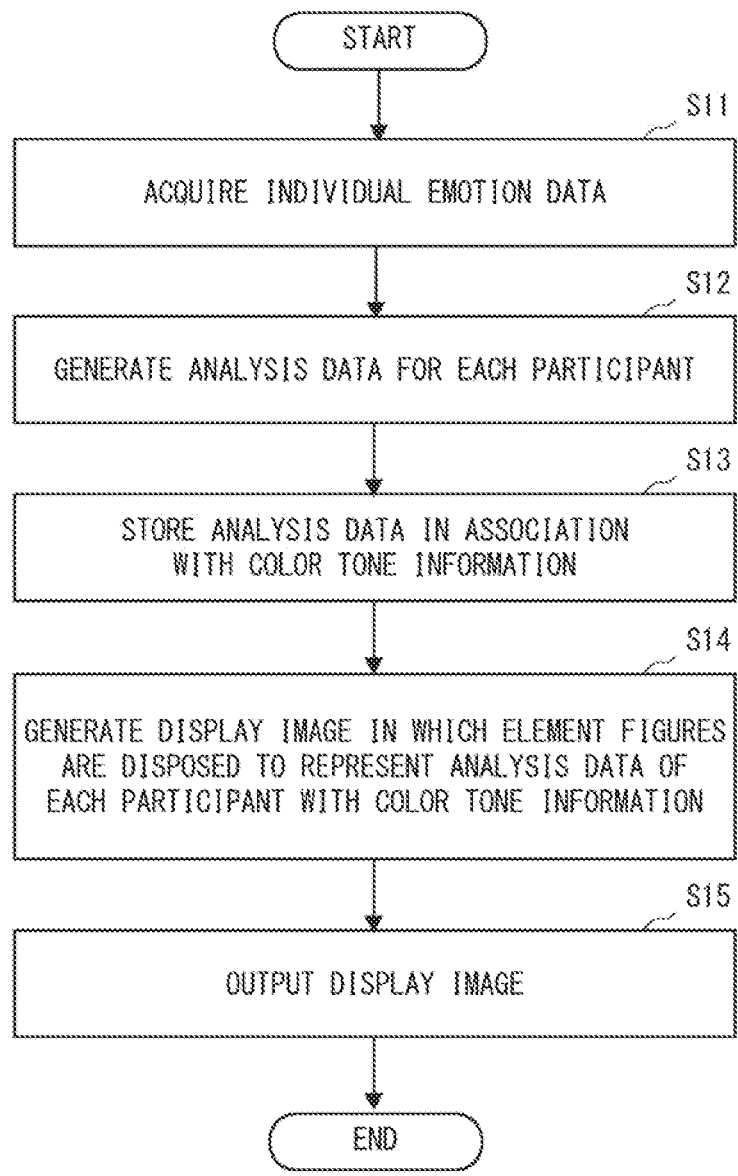
FIG. 2 is a flowchart showing an analysis method according to the first example embodiment.

A first example embodiment will be described with reference to FIGS. 1 and 2. FIG. 1 is a block diagram showing a configuration example of an analysis apparatus according to the first example embodiment.

An analysis apparatus 100 according to the present example embodiment generates analysis data for an online meeting, and generates and outputs a display image based on the analysis data. The processing in the analysis apparatus 100 may be executed in real time during the meeting, or may be executed after the meeting (in other words, offline).

As shown in FIG. 1, the analysis apparatus 100 includes an emotion data acquisition unit (emotion data acquisition means) 111 and an analysis data generation unit (analysis data generation means) 112. The analysis apparatus 100 further includes a storage unit (storage means) 113, an image generation unit (image generation means) 114, and an output unit (output means) 115.

In the present example embodiment, the online meeting refers to a meeting held by using a plurality of meeting terminals communicatively connected to each other via a communication line. The online meeting can be remotely held, for example, as a webinar event, education/corporate training, small group meetings, or the like. Meeting terminals that connect to the online meeting are, for example, personal computers (PCs), smartphones, tablet terminals, camera-equipped mobile phones, and the like. In addition, the meeting terminal is not limited to the above apparatuses as long as the meeting terminal is an apparatus including a camera that captures images of participants, a microphone that collects speech of the participants, and a communication function that transmits and receives image data or voice data. Furthermore, in the following description, the online meeting may be simply referred to as a "meeting".

In the present example embodiment, participants of the online meeting refer to persons who access the online meeting through the meeting terminal, and include the host of the meeting, speakers or presenters of the meeting, and observers of the meeting. For example, in a case where a plurality of persons are participating in a meeting through one meeting terminal, each of the plurality of persons is a participant. In the present example embodiment, it is assumed that participants participate in a meeting in a state where their face images can be captured by a camera built into the meeting terminal or connected to the meeting terminal.

The emotion data acquisition unit 111 acquires individual emotion data for each participant generated on the basis of the face image data of the participants in the online meeting during the meeting. In order to acquire such individual emotion data, the analysis apparatus 100 can be communicatively connected to an emotion data generation apparatus that generates individual emotion data of the participants in the online meeting. The analysis apparatus 100 can also be communicatively connected to a meeting management apparatus that manages the online meeting. Furthermore, the analysis apparatus 100 can be communicatively connected to a terminal (user terminal) of a user who uses the analysis apparatus 100, and the user terminal can be a final output destination of a display image to be described later.

The emotion data generation apparatus is communicatively connected to the meeting management apparatus, and can be configured to receive face image data of participants of the meeting in the online meeting, generate individual emotion data from the face image data, and supply the generated individual emotion data to the analysis apparatus 100. Thereby, the emotion data acquisition unit 111 can acquire the individual emotion data from the emotion data generation apparatus. Regarding the individual emotion data, the emotion data acquisition unit can also acquire individual emotion data by identifying a participant in contrast to emotion data created without identifying a participant. Furthermore, the individual emotion data for each participant can be acquired as emotion data in which the individual emotion data is collected.

The individual emotion data is data serving as an index indicating each emotion of the participants of the meeting. Note that it can be basically said that the emotion data that does not identify the participant is the same type of data as the individual emotion data except that the emotion data is not data for each participant (data that identifies the participant). The individual emotion data includes, for example, a plurality of items (a plurality of types of items) such as a level of attention, a level of confusion, a level of happiness, and surprise. The data of each item is a numerical value of an index indicating the type of each emotion. That is, the individual emotion data indicates how much the participant feels these emotions for each of the above-described items. In this way, the emotion data indicates a plurality of types of emotional states by numerical values, in other words, indicates a plurality of indices indicating emotional states by numerical values. Note that this individual emotion data can also be referred to as expression data indicating a reaction (action) expressed by the participant during the online meeting, and may be generated in consideration of voice data in addition to the face image data.

The individual emotion data acquired by the emotion data acquisition unit 111 can involve time data. The emotion data generation apparatus can generate emotion data for each first period. The first period can refer to, for example, a predetermined time such as one second or one minute. The emotion data acquisition unit 111 can sequentially or collectively acquire the emotion data for each first period throughout the progress time of the meeting. Upon acquiring the emotion data, the emotion data acquisition unit 111 supplies the acquired emotion data to the analysis data generation unit 112.

The analysis data generation unit 112 generates, for each participant, analysis data indicating the degree of emotion in the online meeting on the basis of the individual emotion data. The generated analysis data can be, for example, data obtained by statistically processing the individual emotion data.

The storage unit 113 stores each piece of the analysis data for each participant in association with corresponding color tone information. The color tone information stored in association with the analysis data may be any number assigned to the color tone as long as the number is associated with the color tone. The storage unit 113 can be a storage apparatus including a non-volatile memory such as a flash memory or a solid state drive (SSD).

The image generation unit 114 generates, as a display image indicating the state of the online meeting, an image in which element figures represented by the color tone information associated with the analysis data are disposed for each of a plurality of participants who have participated in the online meeting. In this display image, element figures corresponding to the respective participants are arranged, and each element figure is expressed in a color tone corresponding to the analysis data.

The output unit 115 outputs the display image generated by the image generation unit 114 in this manner. The output unit 115 can output the display image to the user terminal. In particular, in the case of real-time processing, it is preferable that the output unit 115 sequentially output the display image to a system that provides the ongoing online meeting so that the display image can be superimposed on the screen of the ongoing online meeting. The system that provides the online meeting can include the above-described meeting management apparatus, and if the meeting management apparatus is set as an output destination of the analysis data, the meeting management apparatus can superimpose the display image on the screen of the online meeting. Alternatively, regardless of the real-time processing or the offline processing, the output unit 115 can be configured to output the display image to be superimposed on the display image of the user terminal. In this case, the user directly uses the analysis apparatus 100. In order to output the display image to be superimposed, for example, it is possible to use a signal in a format such that the display image is superimposed on the meeting screen in the meeting management apparatus, or to simply use an on screen display (OSD) signal as the display image.

The user who uses the analysis apparatus 100 can recognize how a plurality of participants who are participating or have participated in the meeting feel about the content of the meeting, the speech of the presenter, or the like by perceiving the display based on the display image received by the user terminal. Therefore, the user can perceive, from the visually recognized display image, matters to be noted and the like for a meeting held thereafter (meeting continued in the case of real-time processing). Note that the plurality of participants may or may not include the user himself/herself.

Next, processing of the analysis apparatus 100 according to the first example embodiment will be described with reference to FIG. 2. FIG. 2 is a flowchart showing an analysis method according to the first example embodiment. The flowchart shown in FIG. 2 can be started, for example, when the analysis apparatus 100 receives a signal indicating the start of the meeting from the meeting management apparatus or receives an equivalent signal from the emotion data generation apparatus. Furthermore, in the case of offline processing, the analysis can be started by the analysis apparatus 100 receiving an operation signal for starting analysis based on a user operation.

First, the emotion data acquisition unit 111 acquires individual emotion data for each participant from the emotion data generation apparatus (Step S11). The emotion data acquisition unit 111 may acquire the generated individual emotion data each time the emotion data generation apparatus generates the individual emotion data, or may collectively acquire the individual emotion data at a plurality of different times.

Next, the analysis data generation unit 112 generates analysis data indicating the degree of emotion in the online meeting for each participant on the basis of the individual emotion data received from the emotion data acquisition unit 111 (Step S12). Then, the storage unit 113 stores each piece of the generated analysis data for each participant in association with corresponding color tone information (Step S13).

Next, the image generation unit 114 generates, as a display image indicating the state of the online meeting, an image in which element figures represented by the color tone information associated with the analysis data are disposed for each of a plurality of participants who have participated in the online meeting (Step S14). Thereafter, the output unit 115 outputs the generated display image (Step S15). The processing performed by the analysis apparatus 100 has been described above.

The first example embodiment has been described above. As described above, the analysis apparatus 100 according to the first example embodiment outputs the display image in which the element figure corresponding to each participant is disposed and each element figure is expressed in the color tone corresponding to the analysis data. In particular, in the present example embodiment, the atmosphere of the meeting and the reaction of the participants in the online meeting can be grasped at a glance by such a display image. Therefore, the user who uses the analysis apparatus 100 can easily perceive the display based on the display image received by the user terminal, and can recognize how a plurality of participants who are participating or have participated in the meeting feel about the content of the meeting, the speech of the presenter, or the like. Accordingly, the user who uses the analysis apparatus 100 can perform communication according to the tendency of the emotion of the participant in the online meeting. Therefore, according to the present example embodiment, the online meeting can be effectively managed.

Note that the analysis apparatus 100 includes a processor as a configuration not shown. The storage unit 113 can store a computer program (hereinafter also simply referred to as a program) for executing the analysis method according to the present example embodiment. The processor also reads a computer program from the storage unit 113 into the memory and executes the program.

Each configuration of the analysis apparatus 100 may be implemented by dedicated hardware. Also, some or all of the components may be implemented by a general-purpose or dedicated circuit (circuitry), processor, or the like, or a combination thereof. These may be composed of a single chip or may be composed of a plurality of chips connected via a bus. Some or all of the components of each apparatus may be implemented by a combination of the above-described circuit or the like and a program. Furthermore, a central processing unit (CPU), a graphics processing unit (GPU), a field-programmable gate array (FPGA), or the like can be used as the processor.

Furthermore, in a case where some or all of the components of the analysis apparatus 100 are implemented by a plurality of computation apparatuses, circuits, and the like, the plurality of computation apparatuses, circuits, and the like may be disposed in a centralized manner or in a distributed manner. For example, the computation apparatuses, the circuits, and the like may be implemented in a form in which each of them is connected via a communication network, such as a client server system or a cloud computing system. Furthermore, the function of the analysis apparatus 100 may be provided in a software as a service (SaaS) format.

Second Example Embodiment

Figure 3:
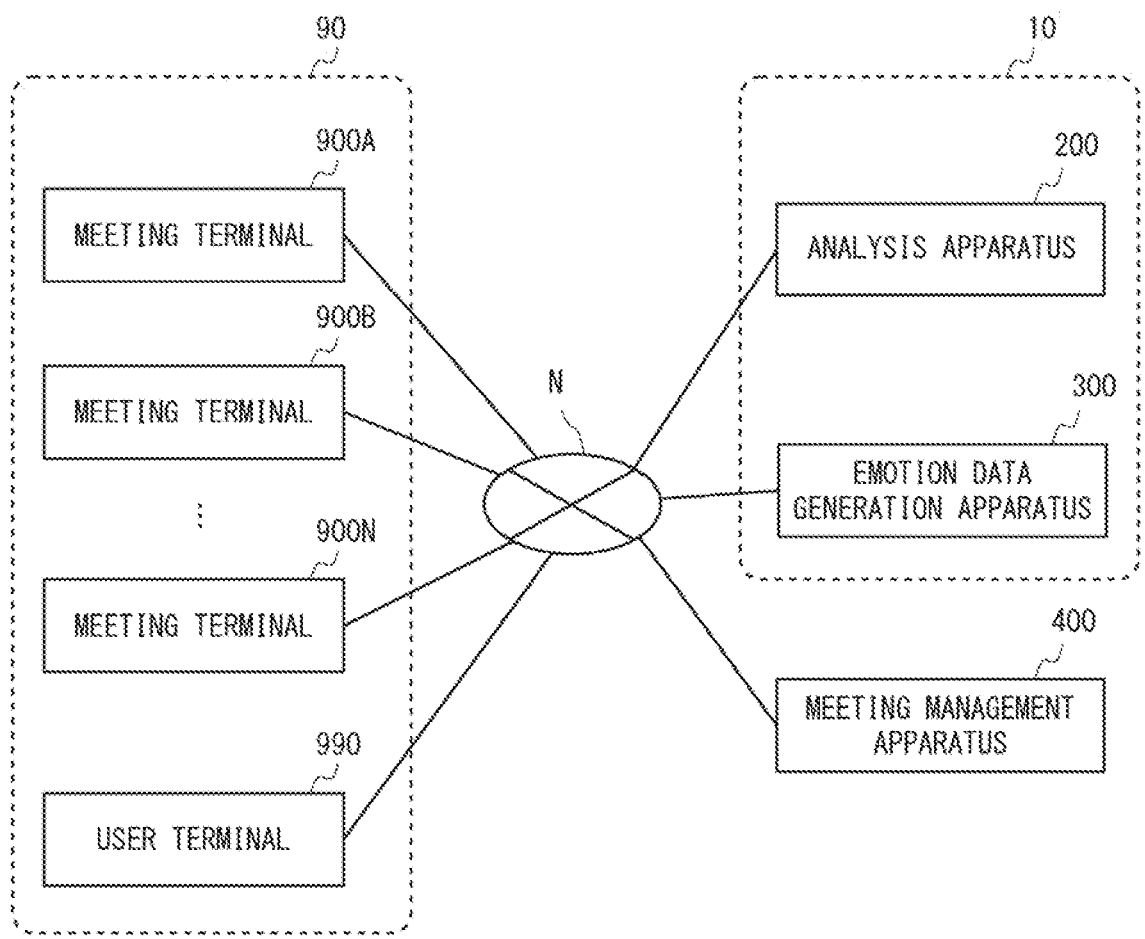
FIG. 3 is a block diagram showing a configuration of an analysis system according to a second example embodiment.

A second example embodiment will be described focusing on differences from the first example embodiment, but various examples described in the first example embodiment can be applied. FIG. 3 is a block diagram showing a configuration example of an analysis system according to the second example embodiment.

As shown in FIG. 3, an analysis system 10 according to the present example embodiment can include an analysis apparatus 200 and an emotion data generation apparatus 300 that generates emotion data and provides individual emotion data to the analysis apparatus 200. The analysis apparatus 200 and the emotion data generation apparatus 300 are communicatively connected to each other via a network N. The analysis system 10 is communicatively connected to a meeting management apparatus 400 via a network N. The meeting management apparatus 400 is connected to a meeting terminal group 90 via the network N to manage an online meeting. The meeting terminal group 90 includes a plurality of meeting terminals (900A, 900B, . . . , 900N) and a user terminal 990.

The user terminal described in the first example embodiment can be the meeting terminal 900A or the like, but even if it is another user terminal 990 that is not used as a meeting terminal, the user can use a total of two terminals together with the meeting terminal. In that case, the display image can be configured to be output to the user terminal 990 side, and the user can check the display image on the user terminal 990 while participating in the meeting on the meeting terminal.

Figure 4:
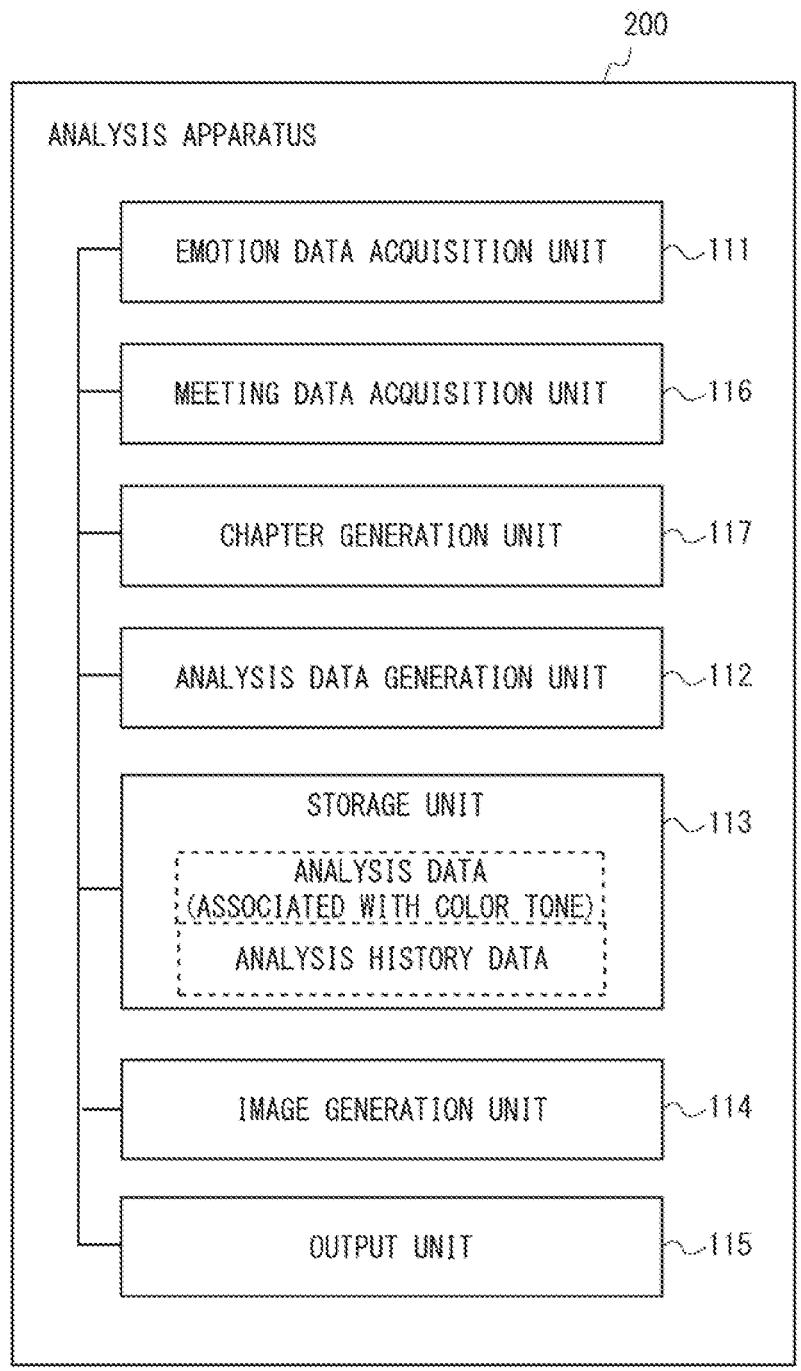
FIG. 4 is a block diagram showing a configuration example of an analysis apparatus according to the second example embodiment.

Next, an analysis apparatus according to the second example embodiment will be described with reference to FIG. 4. FIG. 4 is a block diagram showing a configuration example of the analysis apparatus 200 according to the second example embodiment. The analysis apparatus 200 according to the second example embodiment is different from the analysis apparatus 100 according to the first example embodiment in that it includes a meeting data acquisition unit 116 and a chapter generation unit 117. Hereinafter, each configuration of the analysis apparatus 200 will be described including points different from the analysis apparatus 100.

The emotion data acquisition unit 111 according to the present example embodiment acquires individual emotion data for each participant, in which a plurality of indices indicating emotional states are indicated by numerical values. The individual emotion data of the participant can be data indicating a statistical value (for example, a value obtained by averaging each of the plurality of indices for the participant in the first period) in the first period.

The analysis data generation unit 112 can generate the analysis data, for example, by calculating a statistical value in the second period of the individual emotion data. That is, the analysis data generation unit 112 can generate, for each participant, the analysis data indicating the degree of emotion in the online meeting on the basis of the individual emotion data for each second period. The generated analysis data can be a statistical value in the second period of the individual emotion data. In this case, the storage unit 113, the image generation unit 114, and the output unit 115 in the subsequent stage can also execute processing for each second period and output the display image for each second period.

The second period can refer to, for example, a period from a time when the online meeting that is a target is started to a time when the online meeting ends, and for an ongoing online meeting, a period from a start time to a current time (actually, a time when the individual emotion data can be acquired). Alternatively, the second period can refer to, for example, a period from a predetermined time such as one second or one minute before to the current time, that is, a certain time until the time when the individual emotion data in the ongoing online meeting can be acquired. In this case, analysis data from a certain period before to the current time can be generated. Which period is employed as the second period can be determined in advance.

Furthermore, the individual emotion data used to generate the analysis data can include attribute data indicating an attribute (type) of the online meeting that is a target. The attribute data of the meeting may include, for example, information indicating a meeting type such as a webinar, a regular meeting, or a brainstorming. In addition, the attribute data of the meeting may include information regarding the industry type and occupation type of the company to which the participants of the meeting belong. In addition, the attribute data of the meeting may include information regarding an agenda of the meeting, a purpose of the meeting, a name of the meeting body, or the like.

Then, the analysis data generation unit 112 can be configured to generate the analysis data according to the attribute data. For example, it is sufficient that different analysis values are calculated if the attributes are different. In addition, the analysis data generation unit 112 may select a method of calculating the analysis data on the basis of the attribute data of the meeting and generate the analysis data.

With such a configuration, the analysis apparatus 200 can generate the analysis data according to the attribute of the meeting.

The analysis data generation unit 112 may generate analysis data by relatively comparing a plurality of different meetings. That is, the analysis data generation unit 112 may generate analysis data including a relative comparison result of the meeting corresponding to the attribute data on the basis of the attribute data of the meeting and the analysis history data. In this case, the analysis data generation unit 112 reads the analysis history data stored in the storage unit 113, and compares data regarding a meeting to be newly analyzed with past data that can be a target of comparison. Note that the analysis history data can also be data in a state in which color tone information is associated, whereby a display image of a result of past analysis can also be similarly output. However, if the color tone information is only used for analysis, the color tone information can be stored as history data without being associated with the color tone information.

At this time, the analysis data generation unit 112 determines whether or not the two pieces of data are to be analyzed by comparing the attribute data of the meeting. In this way, in the example of generating the analysis data using the analysis history data, only the analysis history data for the same attribute as the online meeting as the analysis data generation target can be used. Alternatively, the analysis history data of each attribute can be used with different weights for the same attribute, similar attribute, completely different attribute, and the like.

The meeting data acquisition unit 116 acquires meeting data regarding an online meeting that involves time data from the meeting management apparatus 400. The meeting management apparatus 400 is, for example, a server apparatus to which each of the participants of the meeting is communicatively connected. The meeting management apparatus 400 may be included in a meeting terminal 900A or the like used by the participants of the meeting. The meeting data is data regarding a meeting that involves time data, and can include face image data of participants captured during the meeting. More specifically, the meeting data includes a start time and an end time of the meeting. In addition, the meeting data includes a time of a break taken during the meeting. The attribute data described above can be included in the meeting data, and in this case, the meeting data (including the attribute data) and the individual emotion data can be associated with time data. That is, for the attribute data, the meeting data acquisition unit 116 may be configured to acquire the meeting data including the attribute data of the meeting from the meeting management apparatus 400 that manages the meeting.

The meeting data acquisition unit 116 may acquire meeting data including data regarding screen sharing in a meeting. In this case, the meeting data may include, for example, a time when the authority to operate the shared screen shared by the participants (the owner of the shared screen) is switched or a time when the speech of the participant is switched. The meeting data acquisition unit 116 may acquire meeting data including screen data shared in a meeting. In this case, the meeting data may include a time such as page turning in the shared screen or a change in the display image. Further, the meeting data may include what each of the above-described times indicates. The meeting data acquisition unit 116 supplies the acquired meeting data to a chapter generation unit 117 and an analysis data generation unit 112 to be described later.

The chapter generation unit 117 generates a chapter for the online meeting on the basis of the meeting data received from the meeting data acquisition unit 116. The chapter generation unit 117 supplies data indicating the generated chapter to the analysis data generation unit 112. Thereby, as will be described later, a chapter can be used to decide the second period.

The chapter generation unit 117 detects, for example, a time from the start of the meeting to the current time, further detects times that meet a preset condition, and generates data indicating a chapter with each time as a delimiter. As a simple example of this condition, it is possible to set whether a multiple of a predetermined time has elapsed from the start time, or the like, but the condition is not limited thereto. The chapter of the meeting in the present disclosure can be defined by whether a state that meets a predetermined condition is maintained in the meeting or whether the predetermined condition has changed.

Furthermore, the chapter generation unit 117 may generate a chapter on the basis of, for example, data regarding screen sharing. More specifically, the chapter generation unit 117 may generate a chapter in accordance with a timing when the screen sharing is switched. Furthermore, the chapter generation unit 117 may generate a chapter in accordance with a time when the owner of the shared screen in the screen sharing is switched.

The analysis data generation unit 112 generates analysis data every second period from the received individual emotion data and data indicating a chapter. In this example, the second period can be defined as a period from a start time to an end time for a chapter group formed of one chapter or a plurality of consecutive chapters generated by the chapter generation unit 117. That is, the analysis data generation unit 112 can generate the analysis data for the meeting for each chapter or for each chapter group on the basis of the individual emotion data for each participant.

As described in the first example embodiment, the individual emotion data can indicate a plurality of types of emotional states with numerical values. That is, the emotion data acquisition unit 111 can be configured to acquire individual emotion data in which a plurality of indices indicating emotional states are indicated by numerical values.

In this case, the analysis data is data derived from such individual emotion data, and can be data extracted or calculated from numerical values of indices indicating a plurality of types of emotions. The analysis data generation unit 112 can generate analysis data indicating one analysis value by calculating a statistical value of the emotion data. The generated analysis data is preferably an index that is useful for the management of the meeting. For example, the analysis data may include a level of attention, a level of empathy, and a level of understanding for the meeting, or a reaction level to the meeting calculated therefrom. Alternatively, the analysis data may include the speaker's degree of emotional communication with respect to the observer of the meeting. After generating the analysis data for each chapter, the analysis data generation unit 112 supplies the generated analysis data to the storage unit 113 to store it.

The storage unit 113 stores each piece of the analysis data for each participant in association with corresponding color tone information. Note that this processing can be executed mainly by the image generation unit 114 in cooperation with the storage unit 113, but will be described as processing in the storage unit 113 for convenience. In a case where the analysis data is generated on the basis of numerical values of indices indicating a plurality of types of emotions, the storage unit 113 can perform the following association storage. That is, the storage unit 113 can also store, as the color tone information corresponding to the analysis data, color tone information associated with an emotion having significance or superiority among the numerical values of the plurality of types of emotional states in association with the analysis data. For example, in a case where the analysis data is a numerical value indicating the level of attention, a numerical value indicating the level of empathy, and a numerical value indicating the level of understanding, and in a case where the numerical value indicating the level of attention is significant or dominant as compared with others, color tone information associated with the level of attention can be stored in association with the analysis data.

Figure 5:
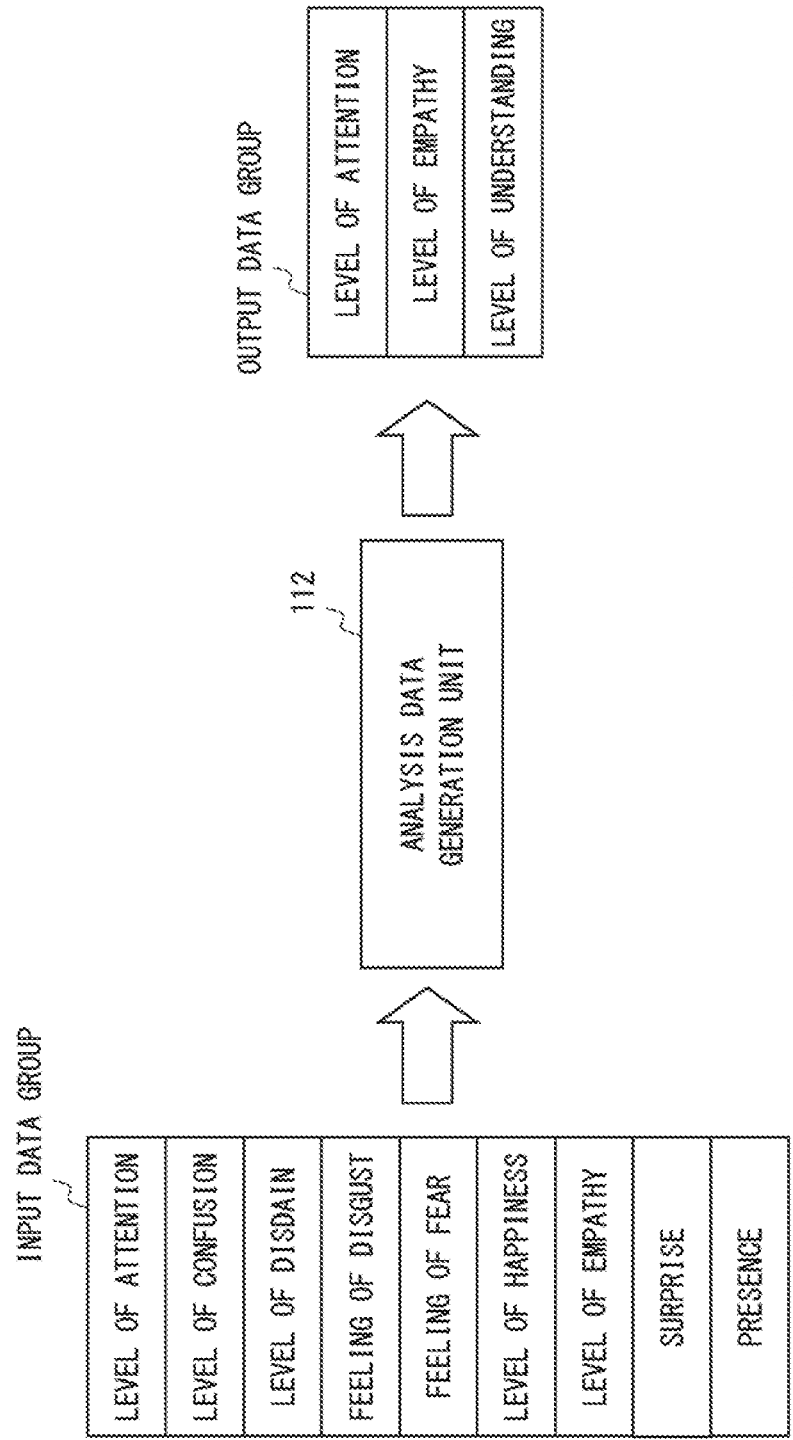
FIG. 5 is a diagram showing an example of data processed by an analysis data generation unit.

The analysis data generation unit 112 will be further described with reference to FIG. 5. FIG. 5 is a diagram showing an example of data processed by the analysis data generation unit 112. FIG. 5 shows an input data group received by the analysis data generation unit 112 and an output data group output by the analysis data generation unit 112. The analysis data generation unit 112 receives emotion data as an input data group from the emotion data generation apparatus 300. The input data group includes, for example, indices regarding a level of attention, a level of confusion, a level of disdain, a feeling of disgust, a feeling of fear, a level of happiness, a level of empathy, surprise, and presence. These indices are indicated by numerical values from 0 to 100, for example. The emotion data of the input data group may be generated from face image data using an existing video processing technology for acquiring, or may be generated and acquired by another method.

Upon receiving the above-described input data group, the analysis data generation unit 112 performs preset processing and generates an output data group using the input data group. The output data group is data that is referred to by a user who uses the analysis system 10 to efficiently hold a meeting. The output data group includes, for example, a level of attention, a level of empathy, and a level of understanding. The analysis data generation unit 112 extracts a preset index from the input data group. In addition, the analysis data generation unit 112 performs preset calculation processing on the value regarding the extracted index. Then, the analysis data generation unit 112 generates the above-described output data group. Note that the level of attention indicated as the output data group may be the same as or different from the level of attention included in the input data group. Similarly, the level of empathy indicated as the output data group may be the same as or different from the level of empathy included in the input data group.

As described in the first example embodiment, the image generation unit 114 generates, as the display image indicating the state of the online meeting, an image in which the element figures represented by the color tone information associated with the analysis data are disposed for each of the plurality of participants who have participated in the online meeting. Thereafter, the output unit 115 outputs the generated display image.

Here, in the case of the real-time processing, it is preferable that the output unit 115 sequentially output the generated display image to a system (including a meeting management apparatus) that provides the ongoing online meeting so that the display image can be superimposed on the screen of the ongoing online meeting. Also in the case of this example, if information for identifying an individual is provided to the meeting management apparatus, it is possible to cause the user terminal of each individual to output a display image for the individual on the screen of the online meeting of the corresponding user terminal. Furthermore, as described above, the output unit 115 can also be configured to output the generated display image to the user terminal as, for example, an OSD signal or the like. The user uses the analysis apparatus 100.

Figure 6:
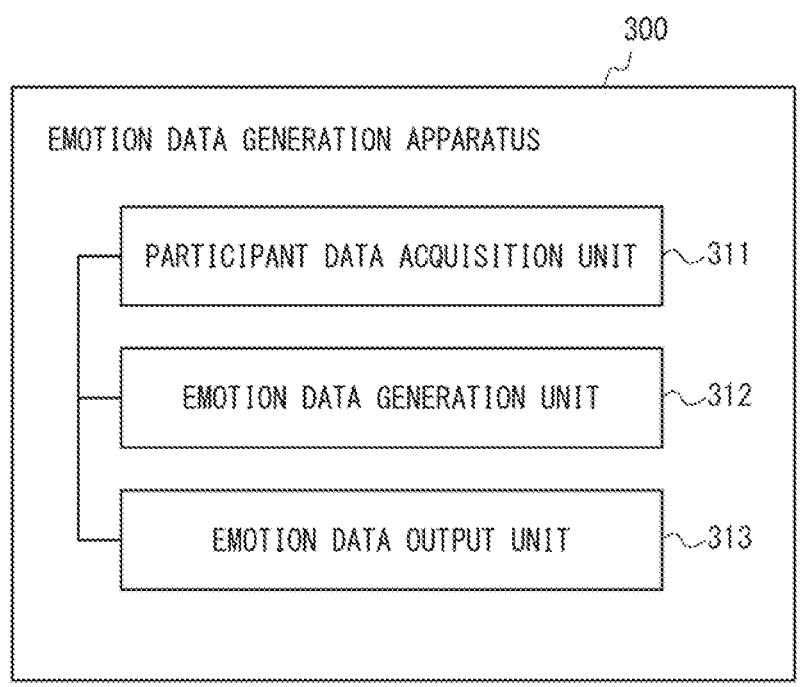
FIG. 6 is a block diagram showing a configuration example of an emotion data generation apparatus according to the second example embodiment.

Next, the emotion data generation apparatus 300 will be described with reference to FIG. 6. FIG. 6 is a block diagram showing a configuration of the emotion data generation apparatus according to the second example embodiment. The emotion data generation apparatus 300 includes a participant data acquisition unit 311, an emotion data generation unit 312, and an emotion data output unit 313 as main configurations.

The participant data acquisition unit 311 acquires data regarding the participants from the meeting management apparatus 400 via the network N. The data regarding the participant is face image data of the participant captured by the meeting terminal during the meeting. In a case where the face image data is included in the meeting data, for example, the meeting management apparatus 400 can extract the face image data from the meeting data and transmit the face image data to the emotion data generation apparatus 300.

The emotion data generation unit 312 generates individual emotion data from the face image data received by the emotion data generation apparatus 300. The emotion data output unit 313 outputs the individual emotion data generated by the emotion data generation unit 312 to the analysis apparatus 200 via the network N. The emotion data generation apparatus 300 generates the emotion data by performing predetermined image processing on the face image data of the participant. The predetermined image processing is, for example, extraction of a feature point (or a feature amount), collation of the extracted feature point with reference data, convolution processing of image data, processing using machine-learned training data, processing using training data by deep learning, and the like. However, the method by which the emotion data generation apparatus 300 generates the emotion data is not limited to the above-described processing. The emotion data may be a numerical value that is an index indicating an emotion or may include image data used in generating the emotion data.

The generation of the individual emotion data will be supplementarily described. If the face image data of the participant captured during the meeting by the meeting terminal is received as data regarding the participant, and face authentication processing based on the face image data registered in advance is executed, the individual participant can be identified, and the individual emotion data can be generated from the face image data of each participant. In addition, even in a case where an individual is not identified, it is possible to identify the same person from the face image data of the participant captured during the meeting, and thus, it is possible to generate individual emotion data. Note that, in an example of one user per meeting terminal, an individual can be identified only by login information at the time of participating in a meeting, and individual emotion data of the individual can be generated from face image data captured by the meeting terminal.

Note that the emotion data generation apparatus 300 includes a processor and a storage apparatus as a configuration not shown. The storage apparatus included in the emotion data generation apparatus 300 stores a program for executing individual emotion data generation according to the present example embodiment. The processor also reads the program from the storage apparatus into the memory and executes the program.

Each configuration of the emotion data generation apparatus 300 may be implemented by dedicated hardware. Also, some or all of the components may be implemented by a general-purpose or dedicated circuit, processor, or the like, or a combination thereof. These may be composed of a single chip or may be composed of a plurality of chips connected via a bus. Some or all of the components of each apparatus may be implemented by a combination of the above-described circuit or the like and a program. In addition, a CPU, a GPU, an FPGA, or the like can be used as the processor.

Furthermore, in a case where some or all of the components of the emotion data generation apparatus 300 are implemented by a plurality of computation apparatuses, circuits, and the like, the plurality of computation apparatuses, circuits, and the like may be disposed in a centralized manner or in a distributed manner. For example, the computation apparatuses, the circuits, and the like may be implemented in a form in which each of them is connected via a communication network, such as a client server system or a cloud computing system. Furthermore, the function of the emotion data generation apparatus 300 may be provided in a SaaS format.

Figure 7:
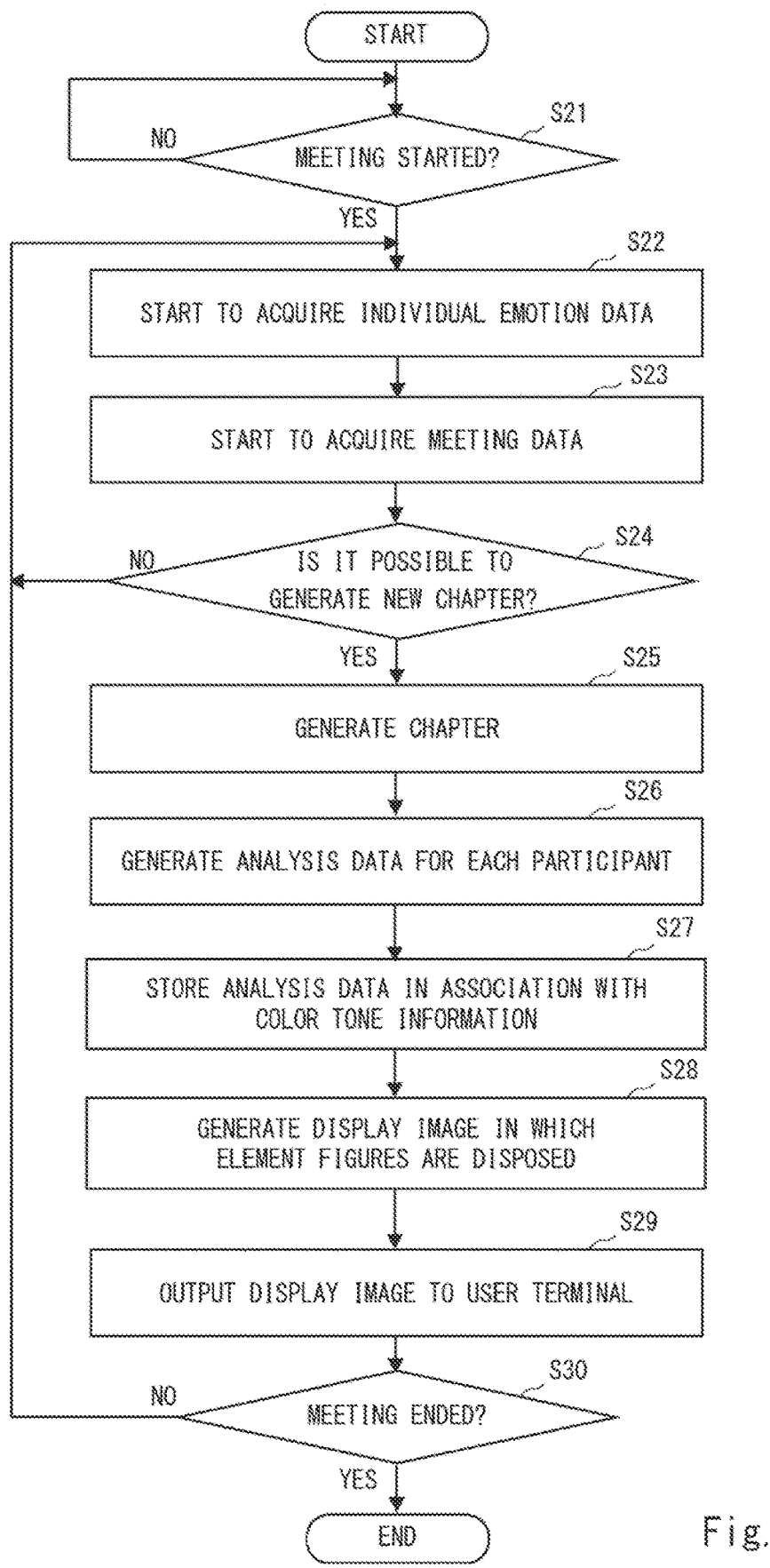
FIG. 7 is a flowchart showing an analysis method according to the second example embodiment.

Next, an example of processing executed by the analysis apparatus 200 will be described with reference to FIG. 7. FIG. 7 is a flowchart showing an analysis method according to the second example embodiment. The processing shown in FIG. 7 is different from the processing according to the first example embodiment in that the second period is set as a chapter period, that is, a display image is output each time a new chapter is generated in an ongoing meeting.

First, the analysis apparatus 200 determines whether or not an online meeting has been started (Step S21). The analysis apparatus 200 determines the start of the meeting by receiving a signal indicating that the meeting has been started from the meeting management apparatus 400. In a case where it is not determined that the online meeting has been started (Step S21: NO), the analysis apparatus 200 repeats Step S21. In a case where it is determined that the online meeting has been started (Step S21: YES), the analysis apparatus 200 proceeds to Step S22.

In Step S22, the emotion data acquisition unit 111 starts to acquire individual emotion data for each participant from the emotion data generation apparatus (Step S22). The emotion data acquisition unit 111 may acquire the generated individual emotion data each time the emotion data generation apparatus generates the individual emotion data, or may collectively acquire the individual emotion data at a plurality of different times.

Next, the meeting data acquisition unit 116 acquires meeting data regarding the meeting that involves time data from the meeting management apparatus (Step S23). The meeting data acquisition unit 116 may receive such meeting data for each first period, or may sequentially receive the meeting data in a case where there is information to be updated in the meeting data. Further, Steps S22 and S23 can be started concurrently.

Next, the analysis apparatus 200 determines whether or not a new chapter can be generated from the received meeting data (Step S24). In a case where it is determined that a new chapter cannot be generated (Step S24: NO), the analysis apparatus 200 returns to Step S22. On the other hand, in a case where it is determined that a new chapter can be generated (Step S24: YES), the analysis apparatus 200 proceeds to Step S25. In Step S25, the chapter generation unit 117 generates a chapter from the meeting data received from the meeting data acquisition unit 116 (Step S25).

Next, the analysis data generation unit 112 generates analysis data indicating the degree of emotion in the online meeting for each participant on the basis of the individual emotion data received from the emotion data acquisition unit 111 (Step S26). The analysis data can also be generated in consideration of meeting data. Then, the storage unit 113 stores each piece of the generated analysis data for each participant in association with corresponding color tone information (Step S27).

Next, the image generation unit 114 generates, as a display image indicating the state of the online meeting, an image in which element figures represented by the color tone information associated with the analysis data are disposed for each of a plurality of participants who have participated in the online meeting (Step S28).

Next, the output unit 115 outputs the generated display image to the user terminal 990 (Step S29). Thereby, the user can check the generated display image in real time. Further, the analysis apparatus 200 determines whether or not the meeting has ended (Step S30). The analysis apparatus 200 determines the end of the meeting by receiving a signal indicating that the meeting has been ended from the meeting management apparatus 400. In a case where it is determined that the meeting has not ended (Step S30: NO), the analysis apparatus 200 returns to Step S22 and continues the process. On the other hand, in a case where it is determined that the online meeting has ended (Step S30: YES), the analysis apparatus 200 ends a series of processes.

The processing of the analysis apparatus 200 according to example embodiment 2 has been described above. According to the above-described flowchart, the analysis apparatus 200 can output a display image for a chapter (or a chapter group) generated each time a new chapter is generated in an ongoing meeting. Accordingly, the user who uses the analysis system 10 can effectively proceed with the meeting by using the display image provided each time a new chapter is generated, etc., in the ongoing meeting. For example, the user can change the degree of communication so as to achieve smooth communication by using a display image provided each time a new chapter is generated in an ongoing meeting.

Figure 8:
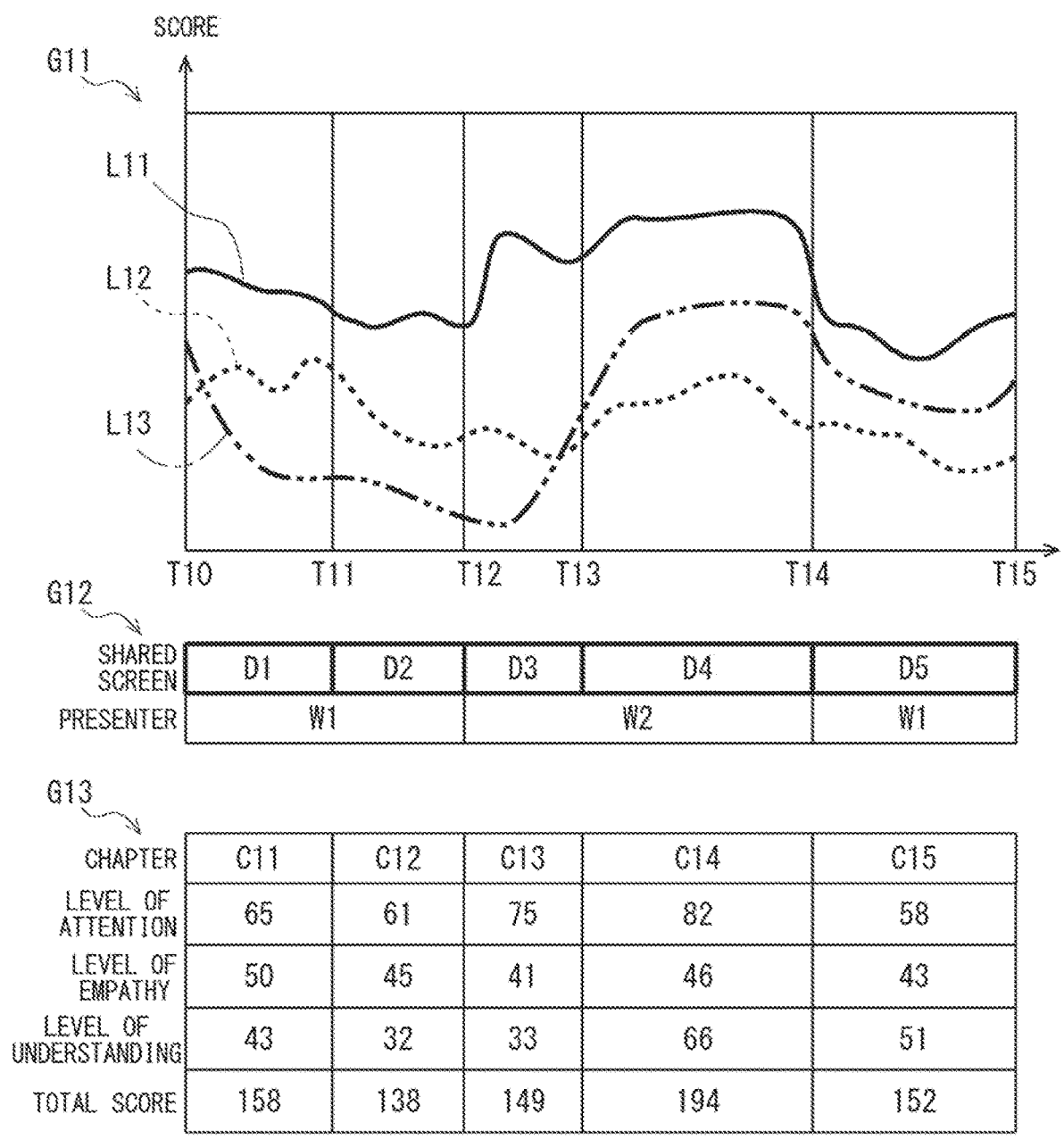
FIG. 8 is a diagram showing a first example of analysis data.

Next, an example of analysis data for a certain participant will be described with reference to FIG. 8. FIG. 8 is a diagram showing a first example of analysis data. In FIG. 8, a graph G11 showing the analysis data in the time series is shown in the upper part. In addition, meeting data G12 corresponding to the above time series is shown in the middle part. Furthermore, in the lower part, analysis data G13 for each chapter corresponding to the meeting data is shown.

In the graph G11, the horizontal axis represents time, and the vertical axis represents the score of the analysis data. In the horizontal axis, the left end is time T10, the time passes as it goes to the right, and the right end is time T15. Time T10 is a start time of the meeting, and time T15 is an end time of the meeting. Times T11, T12, T13, and T14 between time T10 and time T15 indicate times corresponding to chapters to be described later.

In the graph G11, first analysis data L11 indicated by a solid line, second analysis data L12 indicated by a dotted line, and third analysis data L13 indicated by a two-dot chain line are plotted. The first analysis data L11 indicates the level of attention in the analysis data. The second analysis data L12 indicates the level of empathy in the analysis data. The third analysis data L13 indicates the level of understanding of the analysis data.

In the meeting data G12, data regarding a shared screen of a meeting and data regarding a speaker (presenter) are shown in the time series. That is, the data regarding the display screen indicates that the shared screen from time T10 to time T11 was a screen D1. In addition, the data regarding the display screen indicates that the shared screen from time T11 to time T12 was a screen D2. Similarly, according to the meeting data G12, the shared screen in the meeting indicates that the screen from time T12 to time T13 was a screen D3, the screen from time T13 to time T14 was a screen D4, and the screen from time T14 to time T15 was a screen D5. Note that, here, the display screen is basically synonymous with a display image displayed on the entire screen or a part of a screen of a display portion.

In addition, in the meeting data G12, the data regarding the presenter indicates that a period from time T10 to time T12 was a presenter W1. Similarly, the data regarding the presenter indicates that a period from time T12 to time T14 was a presenter W2, and a period from time T14 to time T15 was the presenter W1 again.

The relationship between the shared screen and the presenter in the above-described meeting data G12 will be described in the time series. The presenter W1 progressed the meeting during a period from time T10 when the meeting was started to time T12, and the presenter W1 displayed the screen D1 as a shared screen (that is, shares the screen D1) as the shared screen during a period from time T10 to time T11. Next, during a period from time T11 to time T12, the presenter W1 switched the shared screen from the screen D1 to the screen D2 and continued the presentation. Next, at time T12, the presenter was replaced from the presenter W1 to the presenter W2. The presenter W2 shared the screen D3 during a period from time T12 to time T13, and shared the screen D4 during a period from time T13 to time T14. During a period from time T14 to time T15, the presenter W1 replaced from the presenter W2 shared the screen D5.

The relationship between the shared screen and the presenter in the meeting data G12 has been described above in the time series. As described above, the meeting data shown in FIG. 8 includes data regarding a period in which the screen data on the shared screen has been displayed and data regarding who the presenter is. The chapter generation unit 117 can generate a chapter according to data regarding the shared screen in the above-described meeting data.

In the analysis data G13, data indicating a chapter corresponding to the above-described meeting data and analysis data corresponding to the chapter are shown in the time series. In the example shown in FIG. 8, the data indicating the chapter corresponds to data regarding the shared screen in the meeting data. That is, a first chapter C11 is a period from time T10 to time T11 during which the screen D1 has been shared. Similarly, a second chapter C12 is a period from time T11 to time T12 during which the screen D2 has been shared. A third chapter C13 is a period from time T12 to time T13 during which the screen D3 has been shared. A fourth chapter C14 is a period from time T13 to time T14 during which the screen D4 has been shared. A fifth chapter C15 is a period from time T14 to time T15 during which the screen D5 has been shared.

As shown in FIG. 8, the analysis data G13 includes analysis data corresponding to each chapter. The analysis data indicates a level of attention, a level of empathy, a level of understanding, and a total score obtained by summing these. In the analysis data G13, for example, as the analysis data corresponding to the chapter C11, the level of attention is indicated as 65, the level of empathy is indicated as 50, and the level of understanding is indicated as 43. In addition, the total score is indicated as 158 as the sum of these scores. Similarly, for example, as the analysis data corresponding to the chapter C12, the level of attention is indicated as 61, the level of empathy is indicated as 45, the level of understanding is indicated as 32, and the total score is indicated as 138.

The analysis data corresponds to the data plotted in the graph G11. That is, the analysis data indicated as the analysis data G13 is an average value of the analysis data calculated every predetermined period (for example, one minute) in the period of the corresponding chapter.

The example of the analysis data has been described above. In the example shown in FIG. 8, the chapter generation unit 117 sets the timing when the shared screen is switched in the meeting data as a timing when the chapter is switched. Then, the analysis data generation unit 112 calculates the analysis data from the start of the meeting to the end of the meeting for each chapter described above. Thereby, the analysis system 10 can provide analysis data for each displayed shared screen.

In the example shown in FIG. 8, the analysis system 10 calculates and plots the analysis data every predetermined period as shown in the graph G11 described above. Accordingly, the analysis system 10 can indicate a detailed change in the analysis data in the meeting. However, instead of the calculation as shown in the graph G11, the analysis data generation unit 112 may first calculate a statistical value (for example, an average value) of the emotion data in the chapter after the chapter ends, and then calculate the analysis data. With such a configuration, the analysis system 10 can improve the processing speed of the analysis data.

Figure 9:
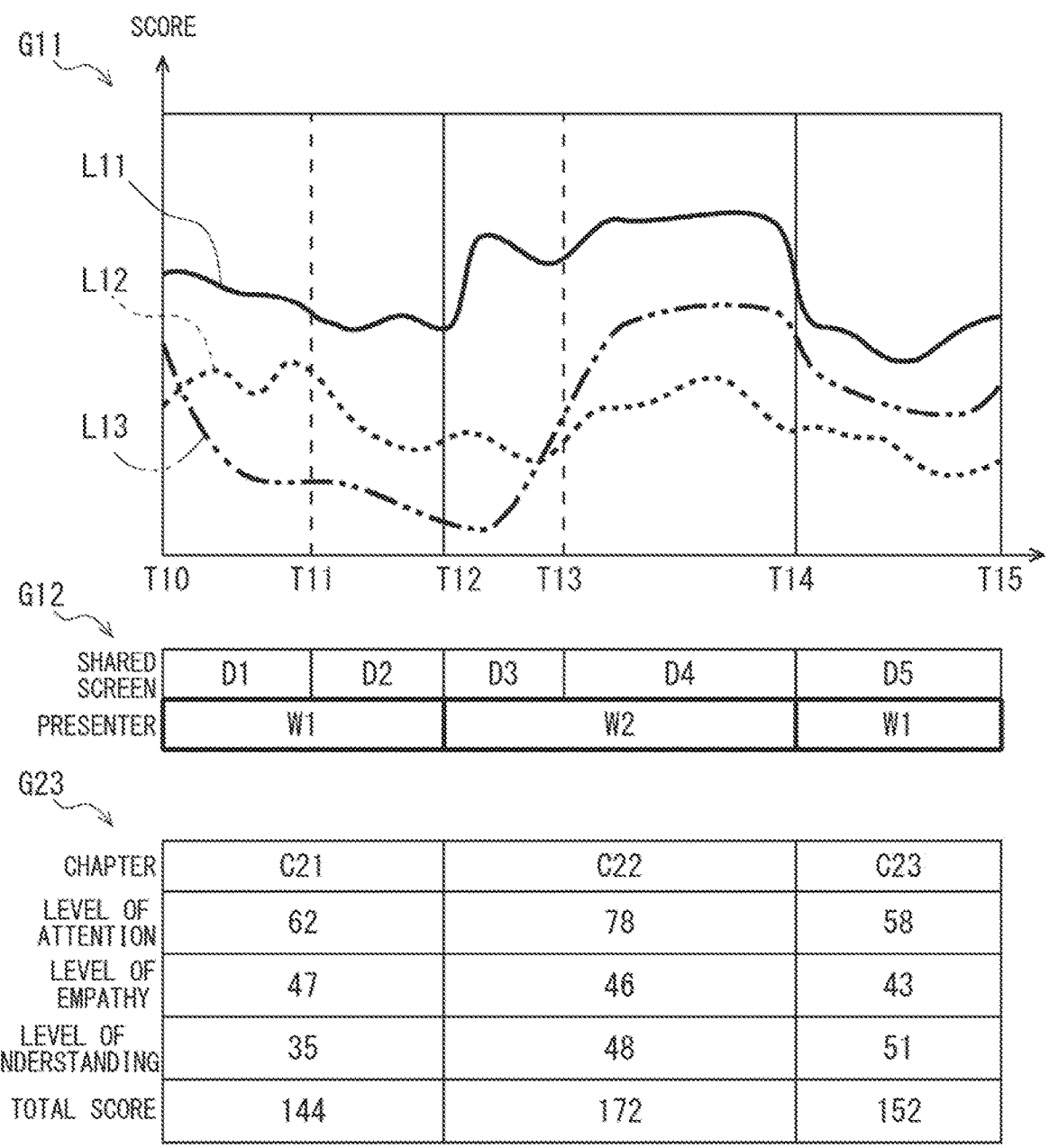
FIG. 9 is a diagram showing a second example of analysis data.

Next, an example of analysis data for a certain participant will be further described with reference to FIG. 9. FIG. 9 is a diagram showing a second example of analysis data. In FIG. 9, first analysis data L11, second analysis data L12, and third analysis data L13 shown in the graph G11 shown in the upper part are the same as those shown in FIG. 8. Meeting data G12 shown in the middle part is the same as that shown in FIG. 8.

Analysis data G23 shown in the lower part of FIG. 9 is different from the analysis data shown in FIG. 8 in that data for generating a chapter is data regarding a presenter. That is, in the example shown in FIG. 9, the chapter generation unit 117 sets a period from time T10 during which the presenter W1 was the presenter to time T12 as a first chapter C21. Similarly, the chapter generation unit 117 sets a period from time T12 during which the presenter W2 was the presenter to time T14 as a second chapter C22. In addition, the chapter generation unit 117 sets a period from time T14 during which the presenter W1 was the presenter to time T15 as a third chapter C23.

In FIG. 9, the analysis data is shown corresponding to the above-described chapters C21 to C23. That is, as the analysis data corresponding to the chapter C21, the level of attention is indicated as 62, the level of empathy is indicated as 47, the level of understanding is indicated as 35, and the total score is indicated as 144. As the analysis data corresponding to the chapter C22, the level of attention is indicated as 78, the level of empathy is indicated as 46, the level of understanding is indicated as 48, and the total score is indicated as 172. As the analysis data corresponding to the chapter C23, the level of attention is indicated as 58, the level of empathy is indicated as 43, the level of understanding is indicated as 51, and the total score is indicated as 152.

The second example of the analysis data has been described above. In the example shown in FIG. 9, the chapter generation unit 117 sets the timing when the presenter is switched in the meeting data as a timing when the chapter is switched. Then, the analysis data generation unit 112 calculates the analysis data from the start of the meeting to the end of the meeting for each chapter described above. Thereby, the analysis system 10 can provide analysis data for each presenter.

Figure 10:
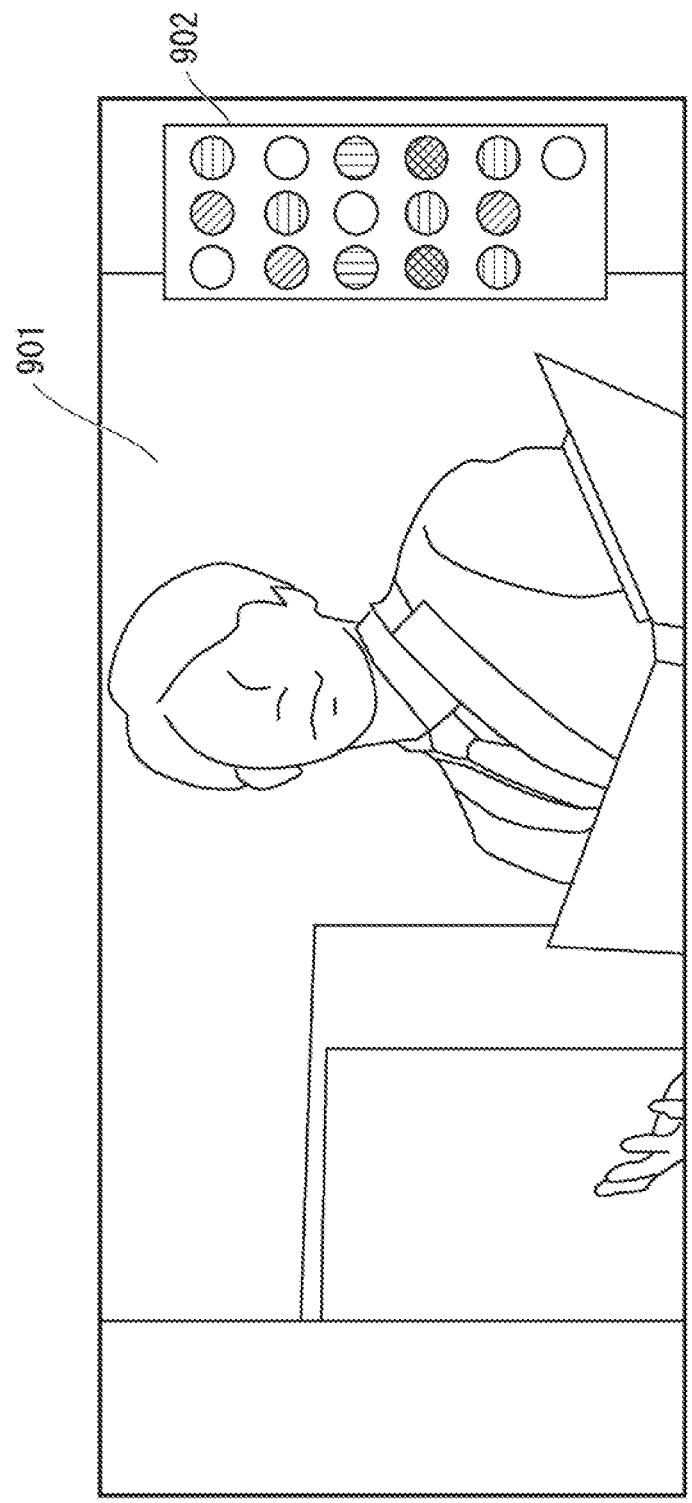
FIG. 10 is a diagram showing a display example of a display image.
Figure 11:
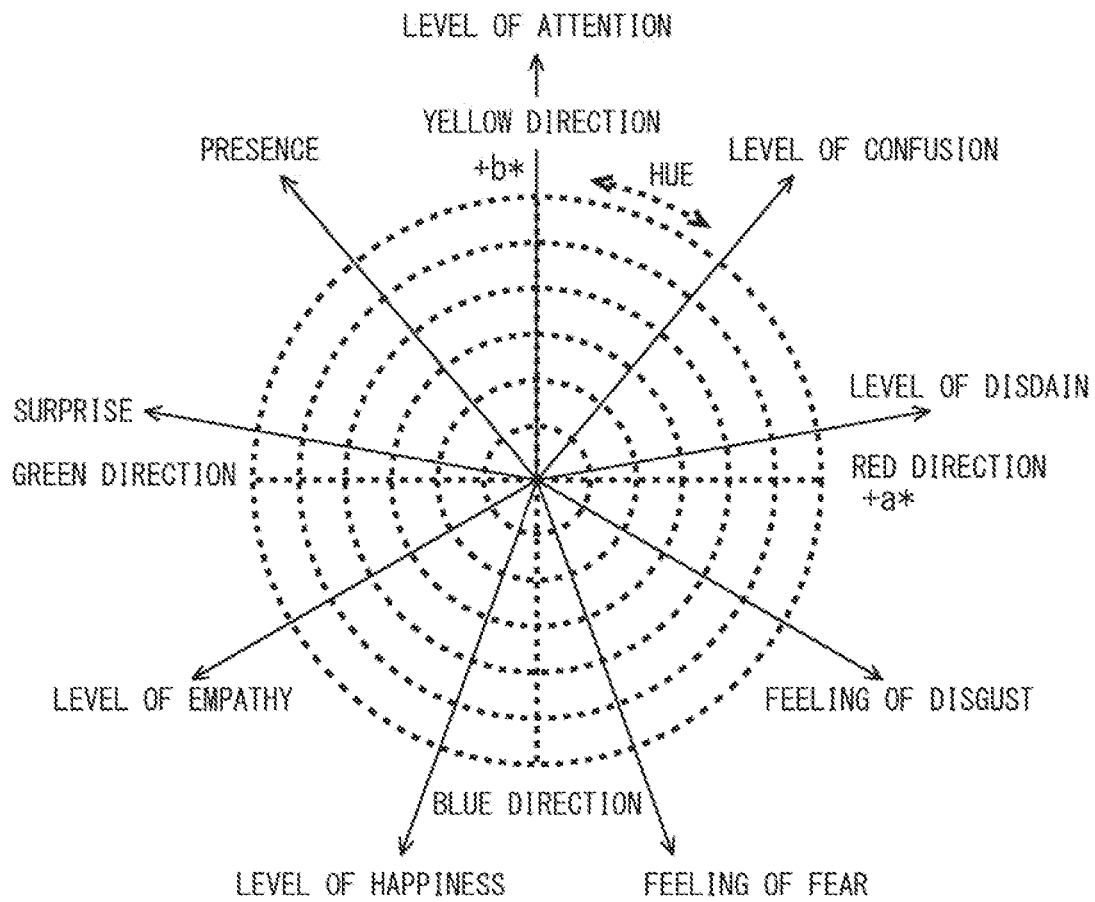
FIG. 11 is a diagram showing an example of a color space corresponding to a figure element.

Next, a display example of a display image, which is one of main features of the present example embodiment, will be described. FIG. 10 is a diagram showing a display example of a display image, and FIG. 11 is a diagram showing an example of a color space corresponding to a figure element.

The output unit 115 in FIG. 4 can output a display image 902 to the meeting terminal 900A or the like in real time so that the display image 902 is superimposed on a meeting image 901 as shown in FIG. 10. In the display image 902, the participants are indicated by circles, and are basically indicated by one circle for one person. However, for example, the participants can also be indicated by one circle for a group to which they belong. In the latter case, the participants included in the group to which they belong may be collectively treated as one person to generate the analysis data and the display image.

As shown in FIG. 10, circles representing participants are arranged, and circles representing participants with different analysis results are given different color tones. The arrangement of the participants is not limited to this, and may be, for example, an arrangement based on the address of the access source to the online meeting or the like, or for example, circles of the participants can be disposed on the map of Japan on the basis of the address or the actual address. In this way, an example in which the display image 902 has a rectangular outer frame has been described, but the present disclosure is not limited thereto. In addition, the position on the display image 902 may be determined for each participant in advance like an address, but a circle of the participant may be filled every time the participant participates in order from the end or analysis data with high accuracy is obtained.

In addition, the circles are merely examples of element figures, and it is needless to say that element figures of other shapes can be employed, and for example, the shapes can be made different according to the segmentation of participants. That is, the image generation unit 114 can also generate, as the display image, an image in which element figures corresponding to the participants are disposed as element figures having different shapes for each piece of segmentation data. For example, it is also possible to employ element figures having different shapes depending on gender and age. Here, the segmentation of the participant is, for example, gender, age, a corporation to which the participant belongs, a department in the corporation, an occupation type of the participant, or the like. Data (segmentation data) indicating the segmentation of the participant may be included in the individual emotion data. Furthermore, not only the shapes may be made different, but also the analysis data generation unit 112 may be configured to generate the analysis data for each participant on the basis of the individual emotion data and the segmentation data (that is, in consideration of the segmentation) (such that the color tone information is different according to the segmentation as a result).

Regarding the color tone, for example, in a case where the analysis data includes a plurality of types of values, a color tone corresponding to the most dominant or significant value can be assigned as described above. In the color space shown in FIG. 11, nine pieces of emotion data output by the emotion data generation apparatus 300 are radially arranged on the La*b* color space. Note that the La*b* color space is a color space in which the circumferential direction represents hue and the radial direction represents color saturation. For example, with respect to analysis data in which the level of attention is the highest value as compared with other items, yellow can be given as a color tone, and a circle can be expressed in yellow.

Note that, although the analysis source data is indicated by the La*b* color space in FIG. 11, the analysis source data may correspond to another color space. For example, the analysis system 10 can cause the analysis data to correspond to the "Plutchik's Wheel of Emotion". In this case, the analysis system 10 plots the significant or dominant analysis data on the Plutchik's Wheel of Emotion, and displays the analysis data by the color tone at the plotted position. Accordingly, the user who uses the analysis data including the color tone can intuitively grasp the tendency of the emotion in the meeting from the analysis data.

Next, a display change example of the display image, in other words, another example of the display image will be described.

Figure 12:
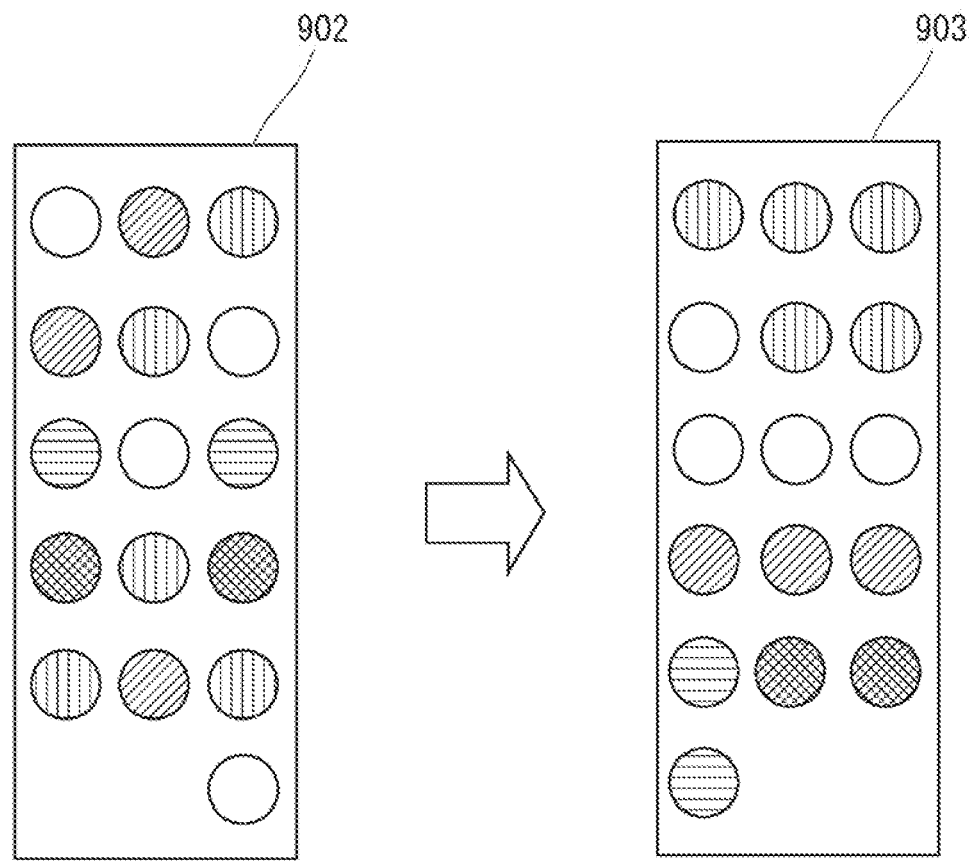
FIG. 12 is a diagram showing a display change example of the display image.

FIG. 12 is a diagram showing a display change example of the display image. As shown in FIG. 12, the display image 902 can be changed to a display image in which color tones are collected as in a display image 903 by changing the setting. That is, the image generation unit 114 can also generate, as the display image, an image in which element figures corresponding to participants are disposed in a state of being grouped for each piece of color tone information.

If the analysis result is biased to a certain emotion in the display image 902, the analysis result can be recognized at a glance. However, in the display image 903, even if there is no such bias, it is possible to recognize at a glance how much participants having what kind of emotion are present. In the example in which the same color tone is collectively displayed as in the display image 903, even in an online meeting in which the same participant group participates, the disposition of the element figure indicating a certain person differs depending on the analysis result, and for example, for participant A, when the analysis result changes, not only the color tone of the circle representing the participant A but also the location will move.

Figure 13:
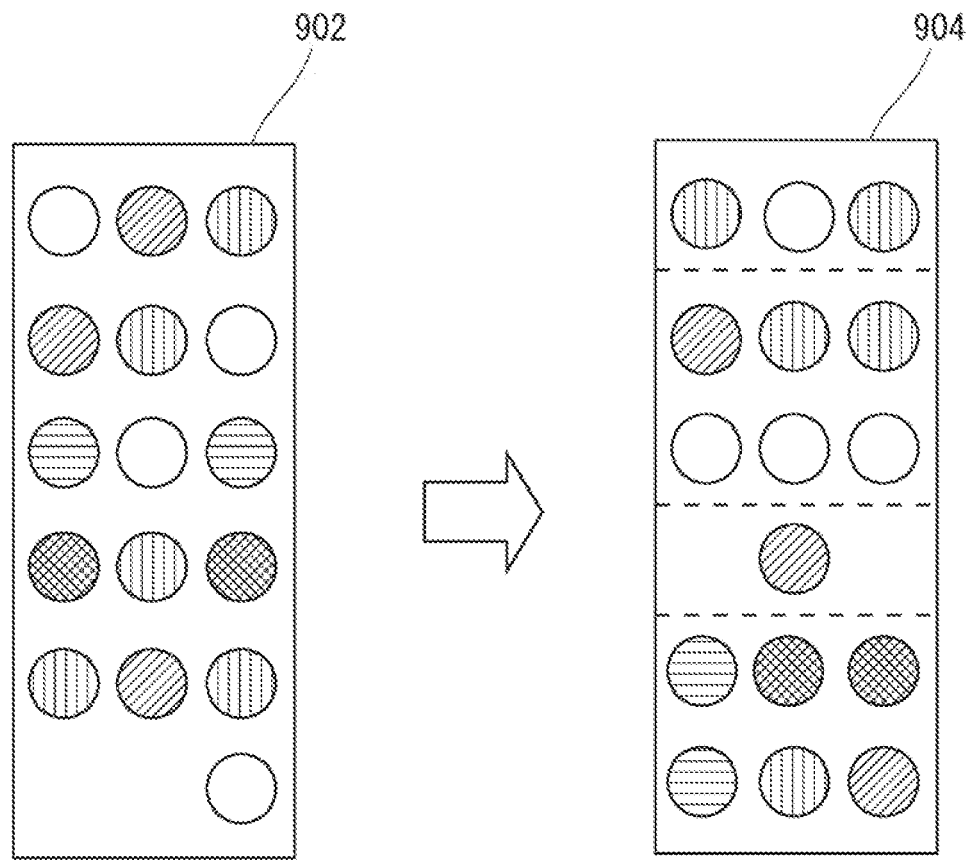
FIG. 13 is a diagram showing another display change example of the display image.

FIG. 13 is a diagram showing another display change example of the display image. As in a display image 904 shown in FIG. 13, the image generation unit 114 can generate an image in which element figures corresponding to participants are disposed on the basis of segmentation data. In particular, the image generation unit 114 can also generate, as the display image, an image in which element figures corresponding to participants are disposed in a state of being grouped for each piece of segmentation data. That is, the display image can also be an image disposed in groups according to the segmentation data. In the display image 904, participants of different segmentations are disposed while separated by a broken line. In this example as well, the individual emotion data may include segmentation data to which the participants belong.

Note that, in a case where the individual emotion data includes the segmentation data to which the participants belong, the segmentation of the participants can be generated from, for example, person attribute data. The person attribute data is data in which face feature information of the person is associated with information regarding a segmentation and an attribute of the person, and may be stored in advance in the emotion data generation apparatus 300 or an apparatus accessible therefrom. The information regarding the segmentation and attribute of the person is, for example, the person's name, gender, age, occupation type, corporation to which the person belongs, or department to which the person belongs, but the present disclosure is not limited thereto. Furthermore, the segmentation of the participants can also be estimated by extracting the face feature information (information on feature points) of the person regarding the face image from the face image data and depending on the extracted information.

Furthermore, for example, a display change button (not shown) is displayed on the display image 902 so as to be selectable by the user, and the display change button is selected by the user, whereby the display can be changed from the display image 902 to the display image 903 (or the display image 904) or in the opposite direction, for example. The former change means rearrangement to a grouped state. Furthermore, for example, a transition button (not shown) is displayed on the display image 902 so as to be selectable by the user, and the transition button is selected by the user, whereby the screen can be transitioned to a screen indicating information as shown in FIG. 8 or FIG. 9 for a case where the user becomes a participant, for example.

Figure 14:
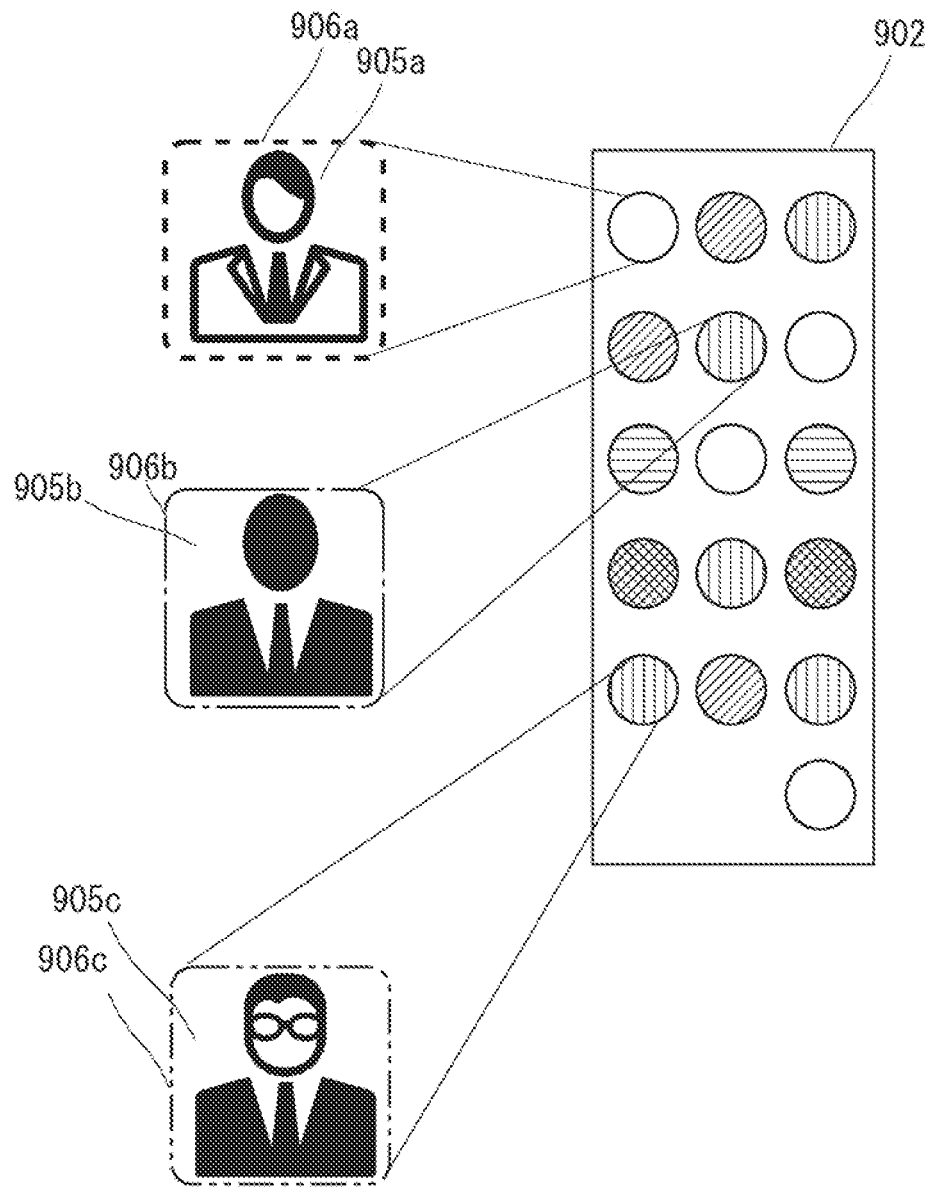
FIG. 14 is a diagram showing another display change example of the display image.

FIG. 14 is a diagram showing another display change example of the display image. In the example shown in FIG. 14, when the user performs an operation of selecting a necessary circle in a state where the display image 902 is displayed, a face image (which may be an illustration) of a corresponding participant, for example, a face image 905a is displayed, and the operator can extract personal information. The face image 905a and the like can be displayed by using face image data that is a generation source of the individual emotion data or by using data of a face image registered in advance for each participant.

Of course, since face images 905a, 905b, and 905c are assumed to be in an unfavorable system environment from the viewpoint of privacy, it is better to make the display/non-display of the face image settable. An icon can be employed instead of the face image. In the example shown in FIG. 14, display frames 906a, 906b, and 906c having at least one of different colors, line types, background colors, and the like are displayed for face images 905a, 905b, and 905c, respectively. These display frames can be examples of element figures.

As shown in FIG. 14, the image generation unit 114 can generate, as a display image, an image in which element figures represented by color tone information associated with analysis data are disposed together with a face image or an icon image of a participant for each of a plurality of participants who have participated in the online meeting.

In addition, in FIG. 14, an example in which the participants are basically indicated by circles has been described, but the participants can be expressed by a face image or an icon and a display frame from the beginning, that is, the element figure can include a display frame.

In the above description, it has been basically described on the assumption that the online meeting is an online meeting that is continuously held. Note that, as described above, since the meeting data includes the time of breaks, the online meeting handled as one may include a plurality of online meetings held at intervals, which can be processed as one online meeting. This is because, when, for example, the break in the meeting is long (e.g., one day or longer), the aforementioned one online meeting may be defined as a plurality of online meetings. The aforementioned plurality of online meetings may be, for example, those having a common theme or those where a certain percentage or more of participants who participate in one online meeting participate in another online meeting as well. The plurality of online meetings may be distinguished from one another by attribute data. However, this is merely one example.

Although the second example embodiment has been described above, the analysis system 10 according to the second example embodiment is not limited to the above-described configuration. For example, the analysis system 10 may include the meeting management apparatus 400. In this case, the analysis apparatus 200, the emotion data generation apparatus 300, and the meeting management apparatus 400 may exist separately, or some or all of them may be integrated. Furthermore, for example, the function of the emotion data generation apparatus 300 is configured as a program, and may be included in the analysis apparatus 200 or the meeting management apparatus 400. For example, the analysis apparatus 200 can also execute identification of a person, generation of individual emotion data, and the like. Further, the meeting management apparatus 400 may be configured to generate a chapter.

Other Example Embodiments

In each of the above-described example embodiments, the function of each unit of the analysis apparatus, the function of each unit of the emotion data generation apparatus, the function of the meeting management apparatus, the function of the meeting terminal (meeting terminal apparatus), and the function of the user terminal (user terminal apparatus) have been described. However, it is sufficient that these functions can be realized as each apparatus. It is also possible to change the division of functions among these apparatuses. Furthermore, various examples described in each example embodiment can be appropriately combined.

Figure 15:
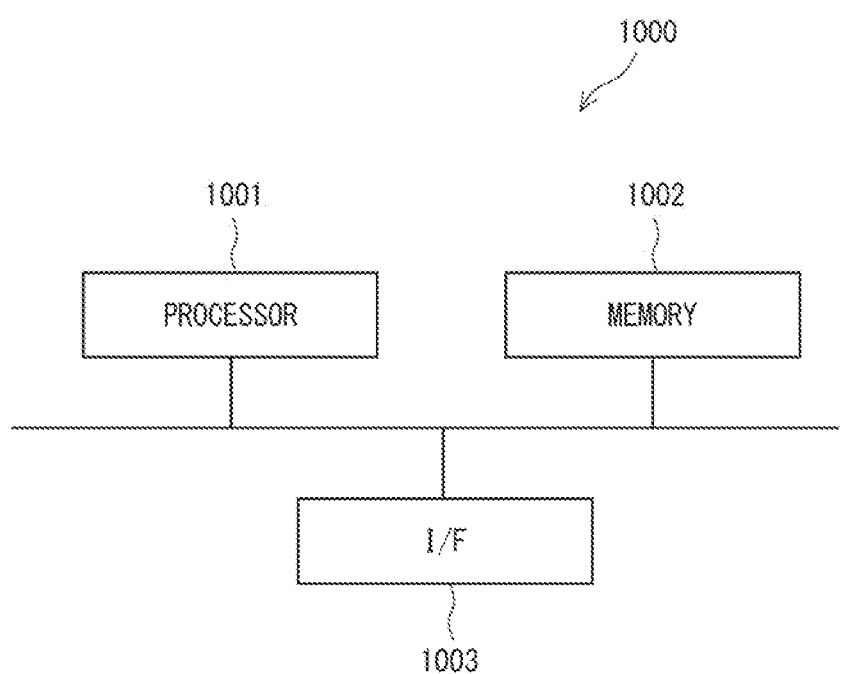
FIG. 15 is a diagram showing an example of a partial hardware configuration of an apparatus.

Furthermore, each apparatus according to each example embodiment can have the following hardware configuration, for example. FIG. 15 is a diagram showing an example of a partial hardware configuration of each apparatus according to each example embodiment.

An apparatus 1000 shown in FIG. 15 includes a processor 1001, a memory 1002, and an interface (I/F) 1003. The I/F 1003 includes a communication I/F for communicating with other apparatuses. In a case where the apparatus 1000 is an apparatus used by a user, the I/F 1003 can include an I/F with the display apparatus, an operation unit for inputting a user operation, or an I/F with an operation unit. The functions of each apparatus described in each example embodiment are realized by the processor 1001 reading a program stored in the memory 1002 and executing the program in cooperation with the I/F 1003.

In the above-described example, the program can be stored using various types of non-transitory computer readable media to be supplied to a computer. The non-transitory computer readable media include various types of tangible storage media. Examples of the non-transitory computer readable media include magnetic recording media (for example, flexible disks, magnetic tapes, or hard disk drives), magneto-optical recording media (for example, magneto-optical disks). Further, this example includes a read only memory (CD-ROM), a CD-R, and a CD-R/W. Furthermore, this example includes a semiconductor memory (for example, a mask ROM, a programmable ROM (PROM), an erasable PROM (EPROM), a flash ROM, or a random access memory (RAM)). The program may also be supplied to the computer by various types of transitory computer readable media. Examples of the transitory computer readable media include electrical signals, optical signals, and electromagnetic waves. The transitory computer readable media can provide the program to the computer via a wired communication line such as an electric wire and optical fibers or a wireless communication line.

Note that the present disclosure is not limited to the above example embodiments, and can be appropriately changed without departing from the scope of the present disclosure. Furthermore, the present disclosure may be implemented by appropriately combining the respective example embodiments.

Some or all of the above example embodiments can be described as the following supplementary notes, but are not limited to the following.

Supplementary Note 1

An analysis apparatus including:
emotion data acquisition means for acquiring individual emotion data for each participant generated based on face image data of the participants in an online meeting during the meeting;
analysis data generation means for generating, for each participant, analysis data indicating a degree of emotion in the online meeting based on the individual emotion data;
storage means for storing each piece of the analysis data for each participant in association with corresponding color tone information;
image generation means for generating, as a display image indicating a state of the online meeting, an image in which element figures represented by the color tone information associated with the analysis data are disposed for each of a plurality of the participants who have participated in the online meeting; and
output means for outputting the display image.

Supplementary Note 2

The analysis apparatus according to Supplementary Note 1, wherein the individual emotion data indicates a plurality of types of emotional states by numerical values.

Supplementary Note 3

The analysis apparatus according to Supplementary Note 2, wherein the storage means stores, as the color tone information corresponding to the analysis data, color tone information associated with an emotion having significance or superiority among the numerical values of the plurality of types of emotional states in association with the analysis data.

Supplementary Note 4

The analysis apparatus according to any one of Supplementary Notes 1 to 3, wherein the image generation means generates, as the display image, an image in which the element figures corresponding to the participants are disposed in a state of being grouped for each piece of the color tone information.

Supplementary Note 5

The analysis apparatus according to any one of Supplementary Notes 1 to 3, wherein
the individual emotion data includes segmentation data to which the participants belong, and
the image generation means generates, as the display image, an image in which the element figures corresponding to the participants are disposed based on the segmentation data.

Supplementary Note 6

The analysis apparatus according to Supplementary Note 5, wherein the image generation means generates, as the display image, an image in which the element figures corresponding to the participants are disposed in a state of being grouped for each piece of the segmentation data.

Supplementary Note 7

The analysis apparatus according to Supplementary Note 5 or 6, wherein the image generation means generates, as the display image, an image in which the element figures corresponding to the participants are disposed as element figures having different shapes for each piece of the segmentation data.

Supplementary Note 8

The analysis apparatus according to any one of Supplementary Notes 1 to 7, wherein the image generation means generates, as the display image, an image in which the element figures represented by the color tone information associated with the analysis data are disposed together with a face image or an icon image of the participant for each of the plurality of participants who have participated in the online meeting.

Supplementary Note 9

The analysis apparatus according to any one of Supplementary Notes 1 to 8, wherein
the individual emotion data includes attribute data indicating an attribute of the online meeting that is a target, and
the analysis data generation means generates the analysis data according to the attribute data for the online meeting.

Supplementary Note 10

The analysis apparatus according to any one of Supplementary Notes 1 to 9, wherein the individual emotion data is data indicating a statistical value in a first period.

Supplementary Note 11

The analysis apparatus according to any one of Supplementary Notes 1 to 10, wherein the analysis data generation means generates the analysis data for each participant based on the individual emotion data for a second period among the individual emotion data acquired by the emotion data acquisition means.

Supplementary Note 12

The analysis apparatus according to Supplementary Note 11, further including:
meeting data acquisition means for acquiring meeting data regarding the online meeting that involves time data; and
chapter generation means for generating a chapter for the online meeting based on the meeting data,
wherein the second period is a period from a start time to an end time for a chapter group formed of one chapter or a plurality of consecutive chapters generated by the chapter generation means.

Supplementary Note 13

The analysis apparatus according to Supplementary Note 12, wherein
the meeting data includes data regarding screen sharing in the online meeting, and
the chapter generation means generates the chapter based on the data regarding the screen sharing.

Supplementary Note 14

The analysis apparatus according to Supplementary Note 13, wherein the chapter generation means generates the chapter in accordance with a timing when the screen sharing is switched.

Supplementary Note 15

The analysis apparatus according to Supplementary Note 13 or 14, wherein the chapter generation means generates the chapter in accordance with a time when an owner of a shared screen in the screen sharing is switched.

Supplementary Note 16

The analysis apparatus according to any one of Supplementary Notes 1 to 15, wherein the online meeting is configured by a plurality of online meetings held at intervals.

Supplementary Note 17

An analysis system including:
the analysis apparatus according to any one of Supplementary Notes 1 to 16; and
an emotion data generation apparatus configured to generate the individual emotion data and provide the individual emotion data to the analysis apparatus.

Supplementary Note 18

An analysis method executed by a computer, the method including:
acquiring individual emotion data for each participant generated based on face image data of the participants in an online meeting during the meeting;
generating, for each participant, analysis data indicating a degree of emotion in the online meeting based on the individual emotion data;
storing each piece of the analysis data for each participant in association with corresponding color tone information;
generating, as a display image indicating a state of the online meeting, an image in which element figures represented by the color tone information associated with the analysis data are disposed for each of a plurality of the participants who have participated in the online meeting; and
outputting the display image.

Supplementary Note 19

A non-transitory computer readable medium storing an analysis program for causing a computer to execute:
a process of acquiring individual emotion data for each participant generated based on face image data of the participants in an online meeting during the meeting;
a process of generating, for each participant, analysis data indicating a degree of emotion in the online meeting based on the individual emotion data;
a process of storing each piece of the analysis data for each participant in association with corresponding color tone information;
a process of generating, as a display image indicating a state of the online meeting, an image in which element figures represented by the color tone information associated with the analysis data are disposed for each of a plurality of the participants who have participated in the online meeting; and
a process of outputting the display image.

REFERENCE SIGNS LIST

10 ANALYSIS SYSTEM
90 MEETING TERMINAL GROUP
100 ANALYSIS APPARATUS
111 EMOTION DATA ACQUISITION UNIT
112 ANALYSIS DATA GENERATION UNIT
113 STORAGE UNIT
114 IMAGE GENERATION UNIT
115 OUTPUT UNIT
116 MEETING DATA ACQUISITION UNIT
117 CHAPTER GENERATION UNIT
200 ANALYSIS APPARATUS
300 EMOTION DATA GENERATION APPARATUS
311 PARTICIPANT DATA ACQUISITION UNIT
312 EMOTION DATA GENERATION UNIT
313 EMOTION DATA OUTPUT UNIT
400 MEETING MANAGEMENT APPARATUS
900A, 900B, 900N MEETING TERMINAL
901 MEETING IMAGE
902, 903, 904 DISPLAY IMAGE
905a, 905b, 905c FACE IMAGE
906a, 906b, 906c DISPLAY FRAME
990 USER TERMINAL
N NETWORK

What is claimed is:

1. An analysis apparatus comprising
at least one memory storing instructions, and
at least one processor configured to execute the instructions to:
acquire individual emotion data for each participant generated based on face image data of the participants in an online meeting during the meeting;
generate, for each participant, analysis data indicating a degree of emotion in the online meeting based on the individual emotion data;
store in the at least one memory, each piece of the analysis data for each participant in association with corresponding color tone information;
generate, as a display image indicating a state of the online meeting, an image in which element figures represented by the color tone information associated with the analysis data are disposed for each of a plurality of the participants who have participated in the online meeting; and
output the display image, wherein
the individual emotion data includes attribute data indicating an attribute of the online meeting that is a target, and
the at least one processor is further configured to execute the instructions to select a method of calculating the analysis data on the basis of the attribute data for the online meeting and to generate the analysis data.

2. The analysis apparatus according to claim 1, wherein the individual emotion data indicates a plurality of types of emotional states by numerical values.

3. The analysis apparatus according to claim 2, wherein the at least one processor is to store in the at least one memory, as the color tone information corresponding to the analysis data, color tone information associated with an emotion having significance or superiority among the numerical values of the plurality of types of emotional states in association with the analysis data.

4. The analysis apparatus according to claim 1, wherein the at least one processor is to generate, as the display image, an image in which the element figures corresponding to the participants are disposed in a state of being grouped for each piece of the color tone information.

5. The analysis apparatus according to claim 1, wherein
the individual emotion data includes segmentation data to which the participants belong, and
the at least one processor is to generate, as the display image, an image in which the element figures corresponding to the participants are disposed based on the segmentation data.

6. The analysis apparatus according to claim 5, wherein the at least one processor is to generate, as the display image, an image in which the element figures corresponding to the participants are disposed in a state of being grouped for each piece of the segmentation data.

7. The analysis apparatus according to claim 5, wherein the at least one processor is to generate, as the display image, an image in which the element figures corresponding to the participants are disposed as element figures having different shapes for each piece of the segmentation data.

8. The analysis apparatus according to claim 1, wherein the at least one processor is to generate, as the display image, an image in which the element figures represented by the color tone information associated with the analysis data are disposed together with a face image or an icon image of the participant for each of the plurality of participants who have participated in the online meeting.

9. The analysis apparatus according to claim 1, wherein the individual emotion data is data indicating a statistical value in a first period.

10. The analysis apparatus according to claim 1, wherein the at least one processor is to generate the analysis data for each participant based on the individual emotion data for a second period among the individual emotion data acquired by the emotion data acquisition means.

11. The analysis apparatus according to claim 10, wherein
the at least one processor is to acquire meeting data regarding the online meeting that involves time data and generate a chapter for the online meeting based on the meeting data, and
the second period is a period from a start time to an end time for a chapter group formed of one generated chapter or a plurality of generated consecutive chapters.

12. The analysis apparatus according to claim 11, wherein
the meeting data includes data regarding screen sharing in the online meeting, and
the at least one processor is to generate the chapter based on the data regarding the screen sharing.

13. The analysis apparatus according to claim 12, wherein the at least one processor is to generate the chapter in accordance with a timing when the screen sharing is switched.

14. The analysis apparatus according to claim 12, wherein the at least one processor is to generate the chapter in accordance with a time when an owner of a shared screen in the screen sharing is switched.

15. The analysis apparatus according to claim 1, wherein the online meeting is configured by a plurality of online meetings held at intervals.

16. An analysis system comprising:
the analysis apparatus according to claim 1; and
an emotion data generation apparatus configured to generate the individual emotion data and provide the individual emotion data to the analysis apparatus.

17. An analysis method executed by a computer, the method comprising:
acquiring individual emotion data for each participant generated based on face image data of the participants in an online meeting during the meeting;
generating, for each participant, analysis data indicating a degree of emotion in the online meeting based on the individual emotion data;
storing each piece of the analysis data for each participant in association with corresponding color tone information;
generating, as a display image indicating a state of the online meeting, an image in which element figures represented by the color tone information associated with the analysis data are disposed for each of a plurality of the participants who have participated in the online meeting; and
outputting the display image, wherein
the individual emotion data includes attribute data indicating an attribute of the online meeting that is a target, and
the generating the analysis data comprises selecting a method of calculating the analysis data on the basis of the attribute data for the online meeting.

18. A non-transitory computer readable medium storing an analysis program for causing a computer to execute:
a process of acquiring individual emotion data for each participant generated based on face image data of the participants in an online meeting during the meeting;
a process of generating, for each participant, analysis data indicating a degree of emotion in the online meeting based on the individual emotion data;
a process of storing each piece of the analysis data for each participant in association with corresponding color tone information;
a process of selecting a method of calculating the analysis data;
a process of generating, as a display image indicating a state of the online meeting, an image in which element figures represented by the color tone information associated with the analysis data are disposed for each of a plurality of the participants who have participated in the online meeting; and
a process of outputting the display image, wherein
the individual emotion data includes attribute data indicating an attribute of the online meeting that is a target, and
the process of selecting a method of calculating the analysis data is based on the attribute data for the online meeting.

* * * * *